US011937219B2

(12) United States Patent
Abedini et al.

(10) Patent No.: US 11,937,219 B2
(45) Date of Patent: Mar. 19, 2024

(54) TIMING ADJUSTMENT TECHNIQUES IN WIRELESS COMMUNICATIONS

(71) Applicant: QUALCOMM Incorporated, San Diego, CA (US)

(72) Inventors: Navid Abedini, Basking Ridge, NJ (US); Wanshi Chen, San Diego, CA (US); Muhammad Nazmul Islam, Littleton, MA (US); Jianghong Luo, Skillman, NJ (US); Luca Blessent, Whitehouse Station, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/688,500

(22) Filed: Mar. 7, 2022

(65) Prior Publication Data

US 2022/0272696 A1 Aug. 25, 2022

Related U.S. Application Data

(63) Continuation of application No. 16/654,968, filed on Oct. 16, 2019, now Pat. No. 11,272,504.
(Continued)

(51) Int. Cl.
*H04W 72/0446* (2023.01)
*H04L 5/00* (2006.01)
*H04W 72/23* (2023.01)

(52) U.S. Cl.
CPC ......... *H04W 72/0446* (2013.01); *H04L 5/005* (2013.01); *H04W 72/23* (2023.01)

(58) Field of Classification Search
CPC ............ H04W 72/0446; H04W 72/23; H04W 56/0045; H04L 5/005
See application file for complete search history.

(56) References Cited

U.S. PATENT DOCUMENTS 11,272,504 B2 3/2022 Abedini et al.
2012/0039239 A1* 2/2012 Park ..................... H04B 7/2606
370/315
(Continued)

FOREIGN PATENT DOCUMENTS

CN 101675689 A 3/2010
CN 108605208 A 9/2018
(Continued)

OTHER PUBLICATIONS

3GPP TS 36.213: "3rd Generation Partnership Project; Technical Specification Group Radio Access Network; Evolved Universal Terrestrial Radio Access (E-UTRA); Physical Layer Procedures (Release 11)", 3GPP Standard, 3rd Generation Partnership Project (3GPP), Mobile Competence Centre; 650, Route Des Lucioles, F-06921, Sophia-Antipolis Cedex, France, vol. RAN WG1, No. V11.3.0, Jun. 25, 2013 (Jun. 25, 2013), pp. 1-176, 20130626, XP050692859, [retrieved on Jun. 25, 2013].
(Continued)

*Primary Examiner* — Yaotang Wang

(74) *Attorney, Agent, or Firm* — Holland & Hart LLP

(57) ABSTRACT

Methods, systems, and devices for wireless communications are described that provide for timing adjustments that may
(Continued)

be used in communications between wireless devices in a wireless communications system and signaling of such timing adjustments using physical layer signaling (e.g., layer 1 (L1) signaling). A first timing adjustment may be provided by a parent node to one or more associated child nodes that corresponds to a propagation delay between the parent node and its control node or a relay node through which the parent node communicates with a core network. In some cases, the physical layer signaling used to transmit the first timing adjustment may be a reference signal transmission, a downlink control information transmission, or any combination thereof.

30 Claims, 25 Drawing Sheets

Related U.S. Application Data

(60) Provisional application No. 62/748,125, filed on Oct. 19, 2018.

(56) References Cited

U.S. PATENT DOCUMENTS

| | | | |
|---|---|---|---|
| 2018/0092139 | A1 | 3/2018 | Novlan et al. |
| 2018/0248736 | A1 | 8/2018 | Davydov et al. |
| 2019/0268883 | A1 | 8/2019 | Zhang et al. |
| 2019/0349871 | A1 | 11/2019 | Ghosh et al. |
| 2020/0022117 | A1 | 1/2020 | Dong et al. |
| 2020/0267696 | A1 | 8/2020 | Li et al. |

FOREIGN PATENT DOCUMENTS

| | | |
|---|---|---|
| GB | 2493707 A | 2/2013 |
| WO | WO-2012129723 A1 | 10/2012 |

OTHER PUBLICATIONS

International Preliminary Report on Patentability—PCT/US2019/056725 The International Bureau of WIPO—Geneva, Switzerland, dated Apr. 29, 2021 (190104WO).
International Search Report and Written Opinion—PCT/US2019/056725—ISA/EPO—dated Jan. 25, 2020 (190104WO).

* cited by examiner

TIMING ADJUSTMENT TECHNIQUES IN WIRELESS COMMUNICATIONS

CROSS REFERENCE

The present Application for Patent is a Continuation of U.S. patent application Ser. No. 16/654,968 by ABEDINI, et al., entitled "TIMING ADJUSTMENT TECHNIQUES IN WIRELESS COMMUNICATIONS" filed Oct. 16, 2019, which claims the benefit of U.S. Provisional Patent Application No. 62/748,125 by ABEDINI et al., entitled "TIMING ADJUSTMENT TECHNIQUES IN WIRELESS COMMUNICATIONS," filed Oct. 19, 2018, assigned to the assignee hereof, and expressly incorporated herein.

INTRODUCTION

The following relates generally to wireless communications, and more specifically to timing techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may include access nodes to facilitate wireless communication between user equipment and a network. For example, an LTE or NR base station may provide a mobile device access to the internet via the wireless network. Access nodes typically have a high-capacity, wired, backhaul connection (e.g., fiber) to the network. In some deployments, however, it may be desirable to deploy a larger number of access nodes in a small area to provide acceptable coverage to users. In such deployments, it may be impracticable to connect each access node to the network via a wired connection, and certain networks or portions thereof may be configured as integrated access and backhaul (IAB) networks where one or more access nodes have wireless backhaul connections to the network. Efficient deployment and operation of such access nodes with wireless backhaul connections may be desirable to enable efficient backhaul connections and enhance end user coverage.

SUMMARY

The described techniques relate to improved methods, systems, devices, and apparatuses that support timing adjustment techniques in wireless communications. Various described techniques provide for timing adjustments that may be used in communications between wireless devices in a wireless communications system and signaling of such timing adjustments using physical layer signaling (e.g., layer 1 (L1) signaling). In some cases, a first timing adjustment may be provided by a parent node to one or more associated child nodes, the first timing adjustment corresponding to a propagation delay between the parent node and its control node or a relay node through which the parent node communicates with a core network. In some cases, the parent node may indicate a second timing adjustment to the one or more child nodes that is based on an associated propagation delay between the parent node and each child node. In some cases, the physical layer signaling used to transmit the first timing adjustment may be a reference signal transmission, a downlink control information transmission, or any combination thereof.

A method of wireless communication is described. The method may include identifying, at a first wireless node, a first timing adjustment value for a first timing reference of a second wireless node and transmitting a first indication of the first timing adjustment value to the second wireless node via physical layer signaling.

An apparatus for wireless communication is described. The apparatus may include a processor, memory in electronic communication with the processor, and instructions stored in the memory. The instructions may be executable by the processor to cause the apparatus to identify, at a first wireless node, a first timing adjustment value for a first timing reference of a second wireless node and transmit a first indication of the first timing adjustment value to the second wireless node via physical layer signaling.

Another apparatus for wireless communication is described. The apparatus may include means for identifying, at a first wireless node, a first timing adjustment value for a first timing reference of a second wireless node and transmitting a first indication of the first timing adjustment value to the second wireless node via physical layer signaling.

A non-transitory computer-readable medium storing code for wireless communication is described. The code may include instructions executable by a processor to identify, at a first wireless node, a first timing adjustment value for a first timing reference of a second wireless node and transmit a first indication of the first timing adjustment value to the second wireless node via physical layer signaling.

Some examples of the method, apparatuses, and non-transitory computer-readable medium described herein may further include operations, features, means, or instructions for transmitting a second indication of a second timing adjustment value to the second wireless node via medium access control (MAC), RRC signaling, or combinations thereof, where the second timing adjustment value may be based on a propagation delay for communication between the first wireless node and the second wireless node, and communicating with the second wireless node based on the second timing adjustment value.

In some examples of the method, apparatuses, and non-transitory computer-readable medium described herein, the first indication may be an implicit indication of the first timing adjustment value. In some examples of the method, apparatuses, and non-transitory computer-readable medium described herein, the transmitting may include operations, features, means, or instructions for transmitting a reference signal that provides the first indication to the second wireless node and one or more other wireless nodes. In some examples of the method, apparatuses, and non-transitory computer-readable medium described herein, a difference between a first timing of the reference signal transmission and a second timing of one or more other downlink transmissions corresponds to the first timing adjustment value. In some examples of the method, apparatuses, and non-transitory computer-readable medium described herein, the reference signal may be a timing advance reference signal (TA-RS). In some examples of the method, apparatuses, and non-transitory computer-readable medium described herein, the reference signal may be one or more of a synchronization signal, a channel state information reference signal (CSI-RS), a tracking reference signal (TRS), or any combinations thereof, and where a timing of the transmission of the reference signal provides the first indication of the first timing adjustment value.

In some examples of the method, apparatuses, and non-transitory computer-readable medium described herein, the reference signal may be a periodic reference signal, an aperiodic reference signal, an event-based reference signal, or an on-demand reference signal that may be transmitted responsive to a request from the second wireless node. In some examples of the method, apparatuses, and non-transitory computer-readable medium described herein, the reference signal may be transmitted in one or more beamformed transmission beams across all or a portion of a coverage area of the first wireless node. In some examples of the method, apparatuses, and non-transitory computer-readable medium described herein, the reference signal may be a cell-specific reference signal associated with the first wireless node. In some examples of the method, apparatuses, and non-transitory computer-readable medium described herein, the reference signal may be quasi-co-located (QCL) with one or more other reference signals.

In some examples of the method, apparatuses, and non-transitory computer-readable medium described herein, the first indication may be an explicit indication of the first timing adjustment value. In some examples of the method, apparatuses, and non-transitory computer-readable medium described herein, the transmitting may include operations, features, means, or instructions for transmitting downlink control information that includes the explicit indication of the first timing adjustment value. In some examples of the method, apparatuses, and non-transitory computer-readable medium described herein, the downlink control information includes a group common downlink control information (GC-DCI) transmission. In some examples of the method, apparatuses, and non-transitory computer-readable medium described herein, the transmitting further may include operations, features, means, or instructions for scrambling the downlink control information using a scrambling identification that corresponds to the first timing reference.

Some examples of the method, apparatuses, and non-transitory computer-readable medium described herein may further include operations, features, means, or instructions for configuring the second wireless node to receive the first indication of the first timing adjustment value. In some examples of the method, apparatuses, and non-transitory computer-readable medium described herein, the configuring may include operations, features, means, or instructions for transmitting one or more of a SIB, RRC signaling, a MAC control element, other higher layer signaling, or any combinations thereof, that includes configuration information for the second wireless node to receive the first indication of the first timing adjustment value.

In some examples of the method, apparatuses, and non-transitory computer-readable medium described herein, the transmitting may include operations, features, means, or instructions for configuring a guard period around the physical layer signaling, and transmitting the first indication of the first timing adjustment value within the guard period, where the physical layer signaling includes L1 signaling. In some examples of the method, apparatuses, and non-transitory computer-readable medium described herein, the guard period may be based on a time difference between the L1 physical layer signaling that provides the first indication of the first timing adjustment value and a timing of one or more other communications with the second wireless node. In some examples of the method, apparatuses, and non-transitory computer-readable medium described herein, the guard period may be configured by a control node in communication with the first wireless node. In some examples of the method, apparatuses, and non-transitory computer-readable medium described herein, a duration of the guard period corresponds to an integer number of symbols or a fraction of a symbol.

In some examples of the method, apparatuses, and non-transitory computer-readable medium described herein, the physical layer signaling used to transmit the first indication of the first timing adjustment value includes L1 signaling, and may have a first cyclic prefix (CP) or subcarrier spacing (SC S) that may be different than a second CP or second SCS of one or more other adjacent signals communicated by the first wireless node.

In some examples of the method, apparatuses, and non-transitory computer-readable medium described herein, the second wireless node and the first wireless node may be nodes in an integrated access and backhaul (IAB) network, and where the first timing adjustment value may be based on distance between relay nodes in the IAB network. In some examples of the method, apparatuses, and non-transitory computer-readable medium described herein, the first timing adjustment value may be provided to the first wireless node, and one or more other wireless nodes, by a control node. n some examples of the method, apparatuses, and non-transitory computer-readable medium described herein, the first wireless node may be a relay node in an IAB network, and where the first timing adjustment value may be based on a first timing advance between the first wireless node and a parent node in the IAB network.

Some examples of the method, apparatuses, and non-transitory computer-readable medium described herein may further include operations, features, means, or instructions for receiving, at the first wireless node, an updated first timing advance from the parent node, where the updated first timing advance may be based on a change in the timing advance between the first wireless node and the parent node in the IAB network, and transmitting, responsive to the updated first timing advance, an updated indication of the first timing adjustment value to the second wireless node via the physical layer signaling, where the physical layer signaling includes L1 signaling.

A method of wireless communication is described. The method may include receiving, at a second wireless node from a first wireless node, a first indication of a first timing adjustment value via physical layer signaling, determining, based on the first indication of the first timing adjustment value, a first timing reference for communications with at least one of the first wireless node or a third wireless node, and communicating with at least one of the first wireless node or the third wireless node based on the first timing reference.

An apparatus for wireless communication is described. The apparatus may include a processor, memory in electronic communication with the processor, and instructions stored in the memory. The instructions may be executable by the processor to cause the apparatus to receive, at a second wireless node from a first wireless node, a first indication of a first timing adjustment value via physical layer signaling, determine, based on the first indication of the first timing adjustment value, a first timing reference for communications with at least one of the first wireless node or a third wireless node, and communicate with at least one of the first wireless node or the third wireless node based on the first timing reference.

Another apparatus for wireless communication is described. The apparatus may include means for receiving, at a second wireless node from a first wireless node, a first indication of a first timing adjustment value via physical layer signaling, determining, based on the first indication of the first timing adjustment value, a first timing reference for communications with at least one of the first wireless node or a third wireless node, and communicating with at least one of the first wireless node or the third wireless node based on the first timing reference.

A non-transitory computer-readable medium storing code for wireless communication is described. The code may include instructions executable by a processor to receive, at a second wireless node from a first wireless node, a first indication of a first timing adjustment value via physical layer signaling, determine, based on the first indication of the first timing adjustment value, a first timing reference for communications with at least one of the first wireless node or a third wireless node, and communicate with at least one of the first wireless node or the third wireless node based on the first timing reference.

Some examples of the method, apparatuses, and non-transitory computer-readable medium described herein may further include operations, features, means, or instructions for receiving a second indication of a second timing adjustment value from the first wireless node via MAC, RRC signaling, or combinations thereof, where the second timing adjustment value may be based on a propagation delay for communications between the first wireless node and the second wireless node, and where the communicating may be further based on the second timing adjustment value. In some examples of the method, apparatuses, and non-transitory computer-readable medium described herein, the communicating with at least one of the first wireless node or the third wireless node may include operations, features, means, or instructions for communicating with the first wireless node using a first set of signals or resources based on the first timing reference, and communicating with the first wireless node using a second set of signals or resources based on a second timing reference that may be different than the first timing reference.

In some examples of the method, apparatuses, and non-transitory computer-readable medium described herein, the first indication may be an implicit indication of the first timing adjustment value. In some examples of the method, apparatuses, and non-transitory computer-readable medium described herein, the receiving may include operations, features, means, or instructions for receiving a reference signal that provides the first indication of the first timing adjustment value. In some examples of the method, apparatuses, and non-transitory computer-readable medium described herein, a difference between a first timing of the reference signal and a second timing of one or more other downlink transmissions corresponds to the first timing adjustment value.

In some examples of the method, apparatuses, and non-transitory computer-readable medium described herein, the reference signal may be a TA-RS. In some examples of the method, apparatuses, and non-transitory computer-readable medium described herein, the reference signal may be one or more of a synchronization signal, a CSI-RS, a TRS, or any combinations thereof, and where a timing of the transmission of the reference signal provides the first indication of the first timing adjustment value. In some examples of the method, apparatuses, and non-transitory computer-readable medium described herein, the reference signal may be a periodic reference signal, an aperiodic reference signal, an event-based reference signal, or an on-demand reference signal that may be transmitted responsive to a request from the second wireless node to the first wireless node. In some examples of the method, apparatuses, and non-transitory computer-readable medium described herein, the reference signal may be QCL with one or more other reference signals.

In some examples of the method, apparatuses, and non-transitory computer-readable medium described herein, the first indication may be an explicit indication of the first timing adjustment value. In some examples of the method, apparatuses, and non-transitory computer-readable medium described herein, the receiving may include operations, features, means, or instructions for receiving downlink control information that includes the explicit indication of the first timing adjustment value. In some examples of the method, apparatuses, and non-transitory computer-readable medium described herein, the downlink control information includes a GC-DCI transmission.

Some examples of the method, apparatuses, and non-transitory computer-readable medium described herein may further include operations, features, means, or instructions for receiving, from the first wireless node, configuration information for monitoring for the first indication of the first timing adjustment value. In some examples of the method, apparatuses, and non-transitory computer-readable medium described herein, the configuration information includes one or more of a SIB, RRC signaling, a MAC control element, or other higher layer signaling that includes configuration information monitoring for the first indication of the first timing adjustment value.

In some examples of the method, apparatuses, and non-transitory computer-readable medium described herein, the physical layer signaling used to transmit the first indication of the first timing adjustment value may have a first CP, SCS, or combination thereof, that may be different than a second CP, second SCS, or combination thereof, of one or more other adjacent signals communicated with the first wireless node, and where the physical layer signaling includes L1 signaling.

DETAILED DESCRIPTION

Figure 1:
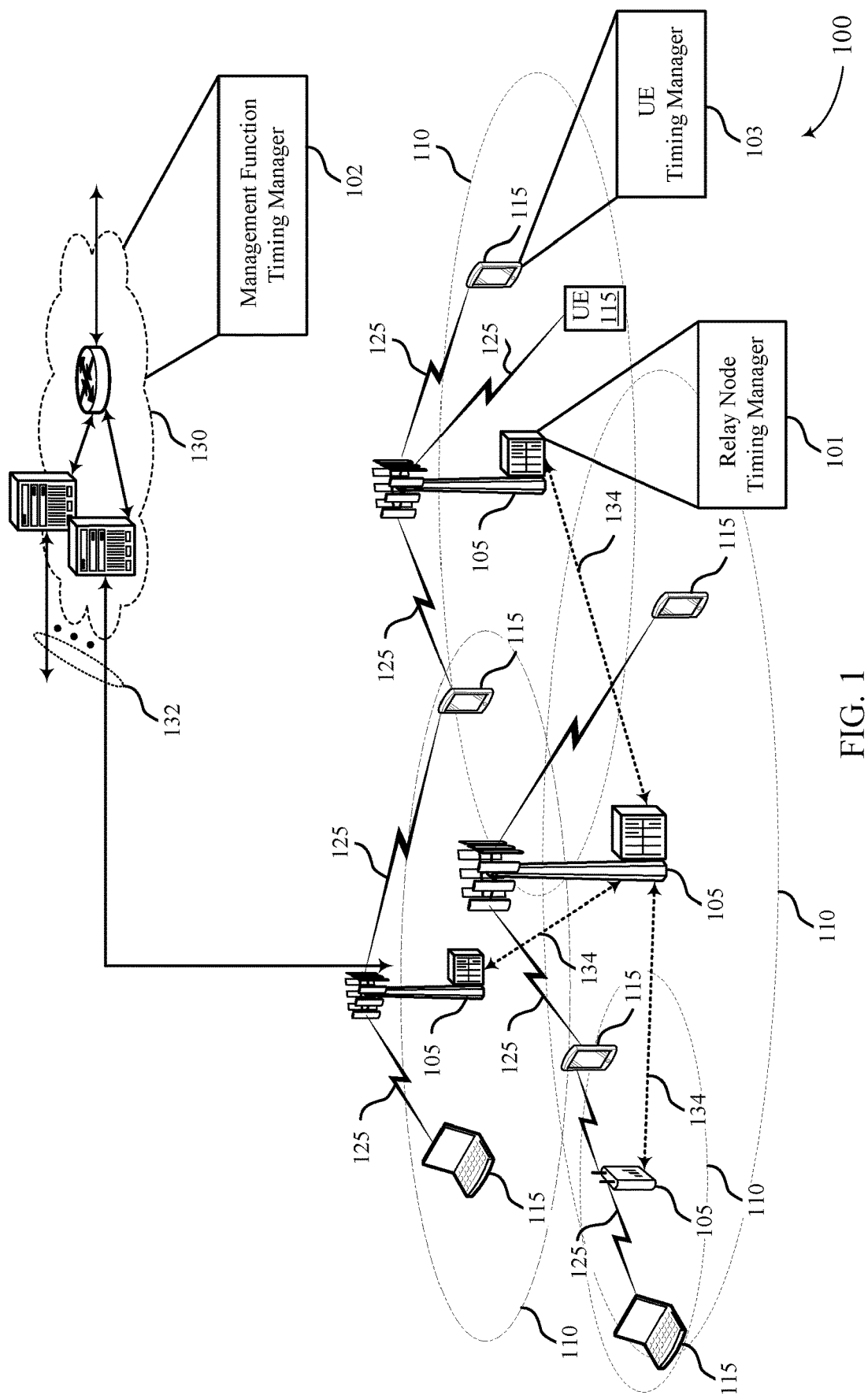
FIG. 1 illustrates an example of a system for wireless communications that supports timing adjustment techniques in wireless communications in accordance with aspects of the present disclosure.

According to some aspects of the disclosure, wireless backhaul links may be used to couple an access node (AN) to a network in place of high-capacity, wired backhaul link (e.g., fiber). An AN may be a base station in a wireless communications system, for example, although other network devices may serve as an AN (e.g., a user equipment (UE) in a peer-to-peer or device-to-device communication system may serve as an AN), and an AN may be referred to generally as a wireless device, wireless node, or relay node herein. In some systems, a first wireless device may establish a wireless backhaul link to a second wireless device which may have a high-capacity, wired backhaul link. In this manner, the first wireless device may communicate access traffic to the network via the second wireless device through the combination of the wireless backhaul link and the wired backhaul link (e.g., a multi-hop link). In some examples, an integrated access and backhaul (IAB) network may use multiple wireless backhaul links before reaching a wired backhaul link, in which the wireless backhaul links share resources with wireless access links. The IAB network may also provide robustness via topological redundancy. In such networks, backhaul resources may be allocated to different wireless communication links between different wireless devices (e.g., ANs or base stations). While various examples provided herein describe IAB networks, the described techniques for timing adjustments across wireless nodes may be generally applied to any type of wireless network.

In order to have synchronized communications between a first wireless device and a second wireless device (e.g., between a UE and a base station), the first wireless device may employ a timing advance (TA) that accounts for propagation delay between the devices, such that the second wireless device receives the associated transmission at a determined time such as a frame or subframe boundary. Techniques are described herein that provide for timing adjustments that may be applied in addition to, or alternatively to, a TA in order to provide synchronized communications between multiple wireless devices. Such techniques may allow a wireless device to adjust timings for receiving communications to have a different timing than used by the wireless device for transmitting communications.

For example, a first wireless node may be a relay node in a wireless network (e.g., a relay node in an IAB network), and transmission timings for downlink transmissions within the wireless network may be aligned across the network. Further, the first wireless node may align timings for receiving transmissions (e.g., for receiving a downlink transmission from a control node and receiving an uplink transmission from a child node) at the first wireless node. In order to provide aligned receipt of transmissions at the first wireless node, a propagation delay between the first wireless node and the control node may be determined, and this value may be provided to the child node. The child node may apply the timing adjustment, plus any further timing advance to compensate for propagation delay between the child node and the first node, to uplink transmissions to the first node. Thus, the first node in such cases receives downlink transmissions from the control node and receives uplink transmissions from the child node according to the aligned receive timing. As indicated, in some cases downlink transmission timings across the wireless network may be aligned, and thus the first wireless node may have a downlink transmission timing that is different than uplink transmission timing.

Such timing adjustment techniques may allow a wireless network to align transmissions such that wireless communications may be provided in an efficient manner with relatively low latencies. In some cases, nodes such as the first wireless node may provide an indication of the timing adjustment values to one or more child nodes via physical layer signaling, which may allow for an indication of the adjustment values to multiple different devices with relatively low overhead and with relatively low latency (e.g., with reduced overhead and reduced latency relative to providing separate higher-layer transmissions to each child node).

Aspects of the disclosure are initially described in the context of exemplary wireless communications systems. Examples of an IAB system and device timings are then described. Aspects of the disclosure are further illustrated by and described with reference to apparatus diagrams, system diagrams, and flowcharts that relate to timing adjustment techniques in wireless communications.

FIG. 1 illustrates an example of a wireless communications system 100 that supports timing adjustment techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support timing adjustments between base stations 105 for establishment of backhaul connections for relay nodes (e.g., base stations 105) supporting timing alignments in which uplink transmissions may have different timings than downlink transmissions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some cases, a base station 105 may serve a first set of UEs 115 that move with base station 105 (e.g., the base station 105 and the first set of UEs 115 are on a moving vehicle) and a second set of UEs 115 that do not move with base station 105 (e.g., the second set of UEs 115 are at least temporarily within a communicable range of base station 105).

In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Base stations 105 may support functionality for operations on an IAB network. For example, base stations 105 may be split into support entities (e.g., functionalities) for promoting wireless backhaul density in collaboration with NR communication access. In some cases, one or more base stations 105 may be split into associated base station central unit (CU) and distributed unit (DU) entities, where one or more DUs may be partially controlled by an associated CU. The CU entities of the one or more base stations 105 (which may also be referred to as a control node) may facilitate connection between the core network 130 and an AN (e.g., via a wireline or wireless connection to the core network). The DUs of the one or more base stations 105-*a* may control and/or schedule functionality for additional devices (e.g., one or more alternative base stations 105, UEs 115) according to configured access and backhaul links. Based on the supported entities at the one or more base stations 105, the one or more base stations 105 may be referred to as donor base stations (e.g., or IAB donors, or relay nodes).

Additionally, in some cases, one or more base stations 105 may be split into associated mobile terminal (MT) and base station DU entities, where MT functionality of the one or more base stations 105 may be controlled and/or scheduled by the DU entities of the one or more donor base stations (e.g., via a Uu interface). DUs associated with the one or more base stations may be controlled by MT functionality. In addition, DUs of the one or more base stations 105 may be partially controlled by signaling messages from CU entities of associated donor base stations on the configured access and backhaul links of a network connection (e.g., via an F1-application protocol (AP)). The DUs of the one or more base stations 105 may support one of multiple serving cells 110 of the network coverage area. The DUs of the one or more base stations 105 may control and/or schedule functionality for additional devices (e.g., one or more alternative base stations 105, UEs 115) according to configured access and backhaul links. Based on the supported entities at the one or more base stations 105, the base stations may be referred to as intermediary base stations (e.g., or IAB nodes).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in some cases in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some wireless communications systems 100, one or more base stations 105 (e.g., a donor base station 105, a donor IAB node, a relay node, etc.) may include CUs and DUs, where one or more DUs associated with a donor base station may be partially controlled by a CU associated with the donor base station. The base station CUs may be a component of a network management function, database, data center, or the core network 130 (e.g., a 5G NR core network (5GC)). In some cases, the base station CU may be in communication with the network management function (e.g., in some cases, the network management function may refer to a separate entity in communication with the base station CU). A base station CU may communicate with a donor base station 105 via a backhaul link 132 (e.g., a wireline backhaul or a wireless backhaul). As another example, in IAB networks, a base station CU (e.g., a donor base station 105) may communicate with the core network 130 (e.g., the NGC) via a backhaul link 132 (e.g., a wireline backhaul or wireless backhaul). The donor base station 105 may be referred to, for example in an IAB network, as an IAB donor or relay node and may be in communication with one or more IAB nodes (e.g., other base stations 105) operating as base station DUs relative to the IAB donor and one or more UEs. For example, an IAB network may include a chain of wireless devices (e.g., starting with the donor base station 105 (a RAN node that terminates an interface with the core network) and ending with a UE 115, with any number of IAB nodes or relay nodes in between). IAB nodes (e.g., relay base stations, relay nodes, etc.) may support MT functionality (which may also be referred to as UE function (UEF)) controlled and scheduled by an IAB donor, or another parent IAB node. IAB nodes (e.g., relay base stations, relay nodes, etc.) may also support DU functionality (which may also be referred to as an access node function (ANF)) relative to additional entities (e.g., IAB nodes, UEs, etc.) within the relay chain or configuration of the access network (e.g., downstream). In some cases, MT functionality may refer to an implementation that supports at least some aspects of a MT or a UE (e.g., as defined by 3GPP TS 23.101 version 8.0.0 Release 8). These relay mechanisms may forward traffic along to the additional entities, extend the range of wireless access for one or more base stations, enhance the density of backhaul capability within serving cells 110, etc.

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

In cases where a base station 105 may function as a relay node, the base station may include a relay node timing manager 101. The relay node timing manager 101 may, in some cases, identify a first timing adjustment value for a first timing reference of one or more child wireless nodes, such as one or more UEs 115. The relay node timing manager 101, in such cases, may transmit a first indication of the first timing adjustment value to the one or more child nodes, and use the first timing adjustment for communications with the one or more child nodes. In some cases, the first timing adjustment may be signaled to the one or more child nodes using physical layer signaling (e.g., L1 signaling). In some cases, the physical layer signaling may include a reference signal transmission (e.g., a timing adjustment reference signal (TA-RS)), or a downlink control information (e.g., a group common downlink control information (GS-DCI)) transmission. Further, in some cases, the relay node timing manager 101 may provide an indication of a second timing adjustment to one or more child nodes, which may indicate a timing advance for a particular child node. In some cases, the indication of the second timing adjustment may be provided using higher layer signaling, such as MAC signaling, RRC signaling, or combinations thereof.

In some cases, the core network 130 may function as a control node or may coordinate with one or more control nodes or relay nodes, and may include a management function timing manager 102. The management function timing manager 102 may indicate timing that is to be used by one or more other nodes in the wireless communications system 100. In some cases, the management function timing manager 102 may configure one or more nodes to align downlink timings and uplink timings for communications that may provide wireless backhaul. For example, the management function timing manager 102 may configure nodes across the wireless communications system 100 to transmit aligned downlink transmissions, and may configure particular nodes, such as one or more relay nodes, to align received transmission at the node (e.g., to align received downlink transmissions from a parent node with received uplink transmissions from a child node).

In cases where a UE 115 communicates with a base station 105 that is acting as an IAB node or relay node, the UE 115 may include a UE timing manager 103. The UE timing manager 103, in some cases, may receive a first indication of a first timing adjustment value from an associated relay node (e.g., a base station 105) that may be used to align received transmissions at the relay node. In some cases, the first indication may be received via physical layer signaling (e.g., via a TA-RS or GC-DCI). The UE timing manager 103 may determine, based at least in part on the first indication of the first timing adjustment value, a first timing reference for communications with the relay node or another node (e.g., a different base station 105 or different relay node).

Figure 2:
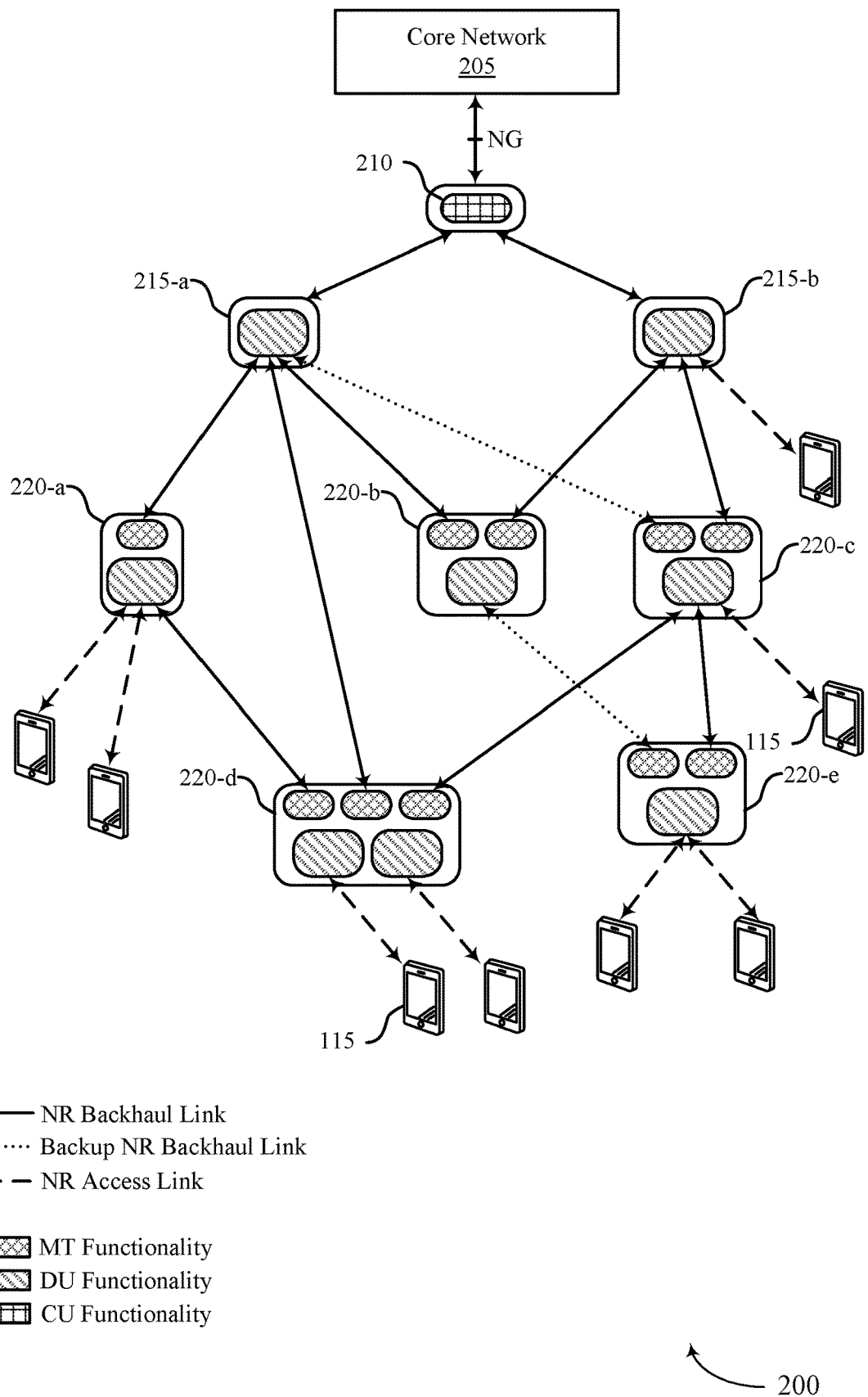
FIG. 2 illustrates an example of a portion of a wireless communications system that supports timing adjustment techniques in wireless communications in accordance with aspects of the present disclosure.

FIG. 2 illustrates an example of a wireless communications system 200 that supports timing adjustment techniques in wireless communications in accordance with aspects of the present disclosure. In some examples, wireless communications system 200 may implement aspects of wireless communications system 100. For example, FIG. 2 illustrates a wireless communications system 200 (e.g., a NR system) that supports sharing of infrastructure and spectral resources for NR access with wireless backhaul link capabilities, in supplement to wireline backhaul connections, providing an IAB network architecture. Wireless communications system 200 may include a core network 205 (e.g., NGC), and base stations or supported devices split into one or more support entities (e.g., functionalities) for promoting wireless backhaul density in collaboration with NR communication access. Aspects of the supporting functionalities of the base stations may be referred to as IAB nodes.

Wireless communications system 200 may include an IAB donor nodes or relay nodes split into associated base station CU 210 and DU 215 entities, where DUs 215 associated with the IAB donor node may be partially controlled by the associated CU 210. CUs 210 of IAB donor nodes may host layer 3 (L3) (e.g., radio resource control (RRC), service data adaption protocol (SDAP), packet data convergence protocol (PDCP), etc.) functionality and signaling. Further CUs 210 of IAB donor nodes may communicate with core network 205 over, for example, an NG interface (which may be an example of a portion of a backhaul link). DUs 215 may host lower layer, such as layer 1 (L1) (e.g., physical (PHY) layer) and layer 2 (L2) (e.g., radio link control (RLC), medium access control (MAC), etc.) functionality and signaling. A DU 215 entity of an IAB donor node may support one of multiple serving cells of the network coverage according to connections associated with backhaul and access links of the IAB network. DUs 215 of the IAB donor node may control both access links and backhaul links within the corresponding network coverage and provide controlling and scheduling for descendant (e.g., child) relay IAB nodes 220 and/or UEs 115.

Relay IAB nodes 220 may be split into associated MT and DU entities. MT functionality (e.g., UEF) of the relay IAB nodes 220 may be controlled and/or scheduled by antecedent IAB nodes (e.g., by an IAB donor or another IAB node as its parent node) of the established connectivity via access and backhaul links of a coverage area. DUs associated with a relay IAB node 220 may be controlled by MT functionality of the node. In addition, DUs of the IAB nodes 220 may be partially controlled by signaling messages from CU 210 entities of associated IAB donor nodes of the network connection (e.g., via an F1-application protocol (AP)). The DUs of the IAB nodes 220 may support one of multiple serving cells of the network coverage area. DU functionality (e.g., access node function (ANF)) may schedule child IAB nodes and UEs, and may control both access links and backhaul links under its coverage.

In some cases, each relay node may include at least one MT function and one DU. The relay may connect to a parent relay node or a donor node via each MT function, and may further support connections to UEs 115 and child relay nodes via the DU. In some cases, all DUs on relay nodes and donor node may be connected to a centralized donor CU (e.g., CU 210), which may hold a network management function, or be connected to a network management function. The network management function may support link management, route management, topology management, resource management, etc. for the wireless communications system 200 (e.g., the IAB network). The connection between DUs across wireless backhaul links may use a modified form of the F1 protocol (e.g., F1*). Each relay node MT function may include an RRC connection to the CU 210. Further, each relay node DU may include a F1*control plane connection to the CU 210. In this manner, the network management function may support link configuration, route configuration, and resource configuration tasks for the wireless backhaul topology.

Wireless communications system 200 may employ relay chains for communications within the IAB network architecture. For example, an IAB donor may support primary and one or more secondary (e.g., parallel or backup) backhaul links to relay IAB nodes 220. The IAB donor may further support one or more access links to additional devices (e.g., UEs 115) or entities of the network. In addition, MT functionality of each of the one or more relay IAB nodes 220 and UEs 115 may be configured to support network connectivity to multiple parent nodes via access and backhaul links associated with coverage areas of the IAB network.

For a relay IAB node to support multiple paths to the CU 210, the relay IAB node may hold multiple MT functions (e.g., multiple MTs). For example, relay IAB node 220-a may support a single MT function (e.g., and may have a single path, or backhaul link, to CU 210), relay IAB node 220-b may support two MT functions (e.g., and may have two paths, or two backhaul links, to CU 210), and relay IAB node 220-d may support a three MT functions (e.g., and may have three paths, or three backhaul links, to CU 210). In cases where a relay IAB node 220 supports multiple MT functions, each MT function may support connectivity to a different parent node. For example, for IAB relay node 220-b, a first MT function may establish a first backhaul link through a first parent node (e.g., DU 215-a) and a second MT function may establish a second backhaul link through a second parent node (e.g., DU 215-b). As another example, for IAB relay node 220-d, a first MT function may establish a first backhaul link through a first parent node (e.g., IAB node 220-a), a second MT function may establish a second backhaul link through a second parent node (e.g., DU 215-a), and a third MT function may establish a third backhaul link through a third parent node (e.g., IAB node 220-c, and eventually through DU 215-a or DU 215-b after relay by IAB node 220-c).

In such a manner, IAB nodes supporting multiple MT functions may support topological redundant paths in the wireless communications system 200. In some cases, a network management function (e.g., associated with CU 210) may configure multiple paths (e.g., multiple backhaul links) to be used in parallel or simultaneously (e.g., such as for relay IAB node 220-b). Multi-path connectivity via such multiple backhaul links may provide robustness to radio link failure on backhaul links (e.g., on deteriorating backhaul links). Further, capacity optimization through load balancing across the multiple backhaul paths may also be realized (e.g., to increase backhaul throughput, reduce latency associated with backhaul over a single backhaul link, etc.). In order for a network management function to coordinate and configure multiple backhaul links (e.g., for relay nodes supporting multiple MT functions), the management function may first become away that a relay node supports such multiple MT functionality (e.g., and is therefore capable of multi-connected cellular backhaul.

As indicated above, in some cases timing for communications between DU 215, IAB nodes 220, and UEs 115 may be aligned in order to provide efficient communications over the wireless communications system 200. In some cases, a wireless device that receives downlink transmissions from a parent node (e.g., from an IAB node 220 or DU 215) and transmits uplink transmissions to the parent node may employ timing adjustments according to various techniques provided herein. In some cases, timing adjustments that may be applied in addition to, or alternatively to, a TA in order to provide synchronized communications between multiple wireless devices.

For example, relay IAB node 220-c may be referred to as a first IAB node 220-c, and may be configured with transmission timings for downlink transmissions to associated UEs 115 that are aligned across the wireless communications system 200 such that downlink transmissions of IAB nodes 220 are aligned with downlink transmissions of DUs 215. Further, first IAB node 220-c may align timings for receiving transmissions, such as timings for receiving a downlink transmission from DU 215-b and receiving an uplink transmission from a child IAB node 220-e and one or more associated UEs 115. In order to provide aligned receipt of transmissions at the first IAB node 220-c, a propagation delay between the parent node, which in this example is DU 215-b, and first IAB node 220-c may be determined, and this value may be provided to the child IAB node 220-e as a timing adjustment. The child IAB node 220-e may apply the timing adjustment, plus any further timing advance to compensate for propagation delay between the child IAB node 220-e and first IAB node 220-c, to uplink transmissions to the first IAB node 220-c. Thus, the first IAB node 220-c in such cases receives downlink transmissions from the control node DU 215-b and receives uplink transmissions from the child IAB node 220-e (and any associated UEs 115) according to the aligned receive timing. Further, as downlink transmission timings across the wireless communications system 200 may be aligned, the first IAB node 220-c may have a downlink transmission timing that is different than its uplink transmission timing.

Figure 3:
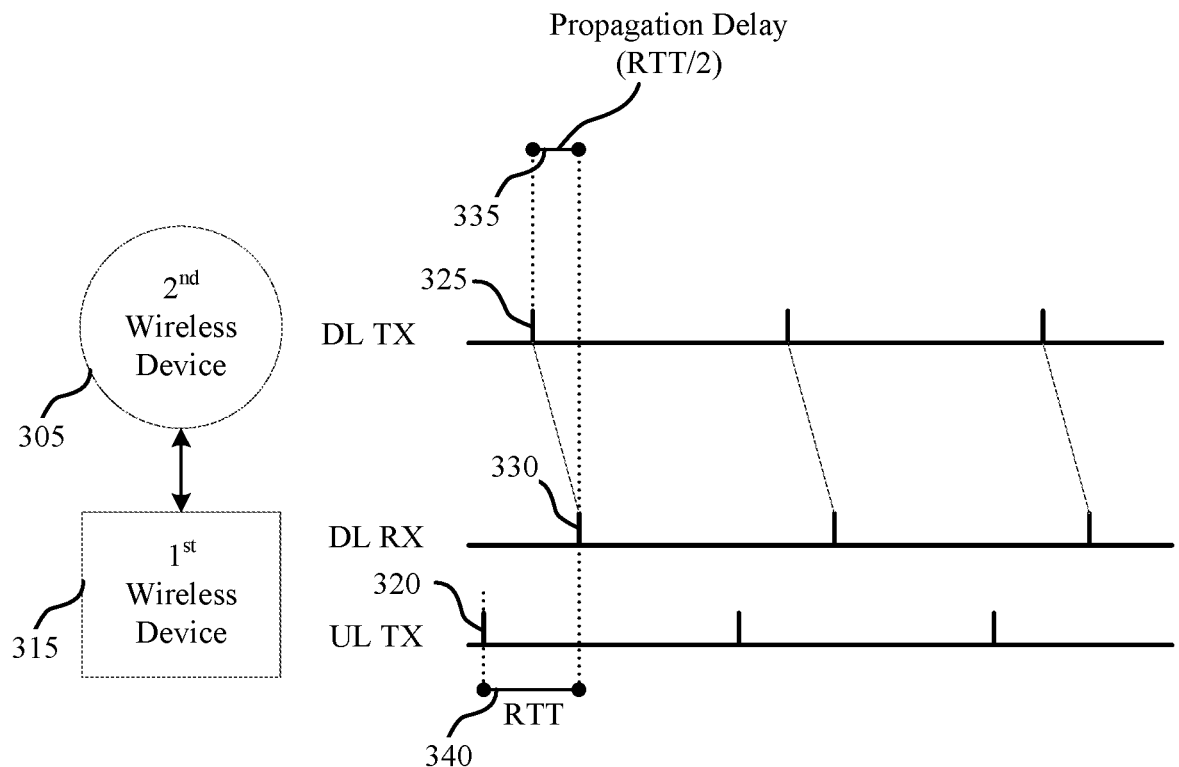
FIG. 3 illustrates an example of wireless node timing in wireless communications in accordance with aspects of the present disclosure.

FIG. 3 illustrates an example of a wireless node timing 300 that supports timing adjustment techniques in wireless communications in accordance with aspects of the present disclosure. In some examples, wireless node timing 300 may implement aspects of wireless communications system 100 or 200. In this example, a first wireless device 315, which may be an example of a UE 115 or an instantiation of a UEF, may transmit an uplink transmission to a second wireless device 305 which may be an example of a base station 105 or an instantiation of an ANF.

The uplink transmission may be transmitted at a first time 320, which may be timed to arrive at the second wireless device 305 at a second time 325 that is later than the first time 320. Similarly, a downlink transmission may be transmitted from the second wireless device 305 to the first wireless device 315. The downlink transmission may start at second time 325, and the first wireless device may start receiving the downlink transmission at third time 330 that is later than the second time 325 due to propagation delay 335 (i.e., the speed of light times the distance between the devices). A round trip time (RTT) 340 may correspond to the time that it would take for a transmission to go from the first wireless device 315 to the second wireless device 305 and then back to the first wireless device 315.

When establishing an access link between the first wireless device 315 and the second wireless device 305, the second wireless device 305 may estimate the RTT 340 and provide the first wireless device 315 an uplink TA command that includes a TA value. In such cases, the provided TA values is an estimation of RTT 340, and the first wireless device 315 may compensate the provided TA value with a more accurate measurement for uplink transmissions. In some cases, the second wireless device 305 may provide the TA value in a TA command in a MAC-CE (e.g., provided in a random access response). Thus, the TA value in such cases may be provided in L2 signaling.

As discussed above, in some cases, the uplink transmission timing of the first wireless device 315 may depend upon one or more other factors other than RTT 340 or propagation delay 335. For example, in some IAB networks the second wireless device 305 may be a relay node in an IAB network, which may have receive timings that are different than its downlink transmit timing. An example of such a case is illustrated in FIG. 4.

Figure 4:
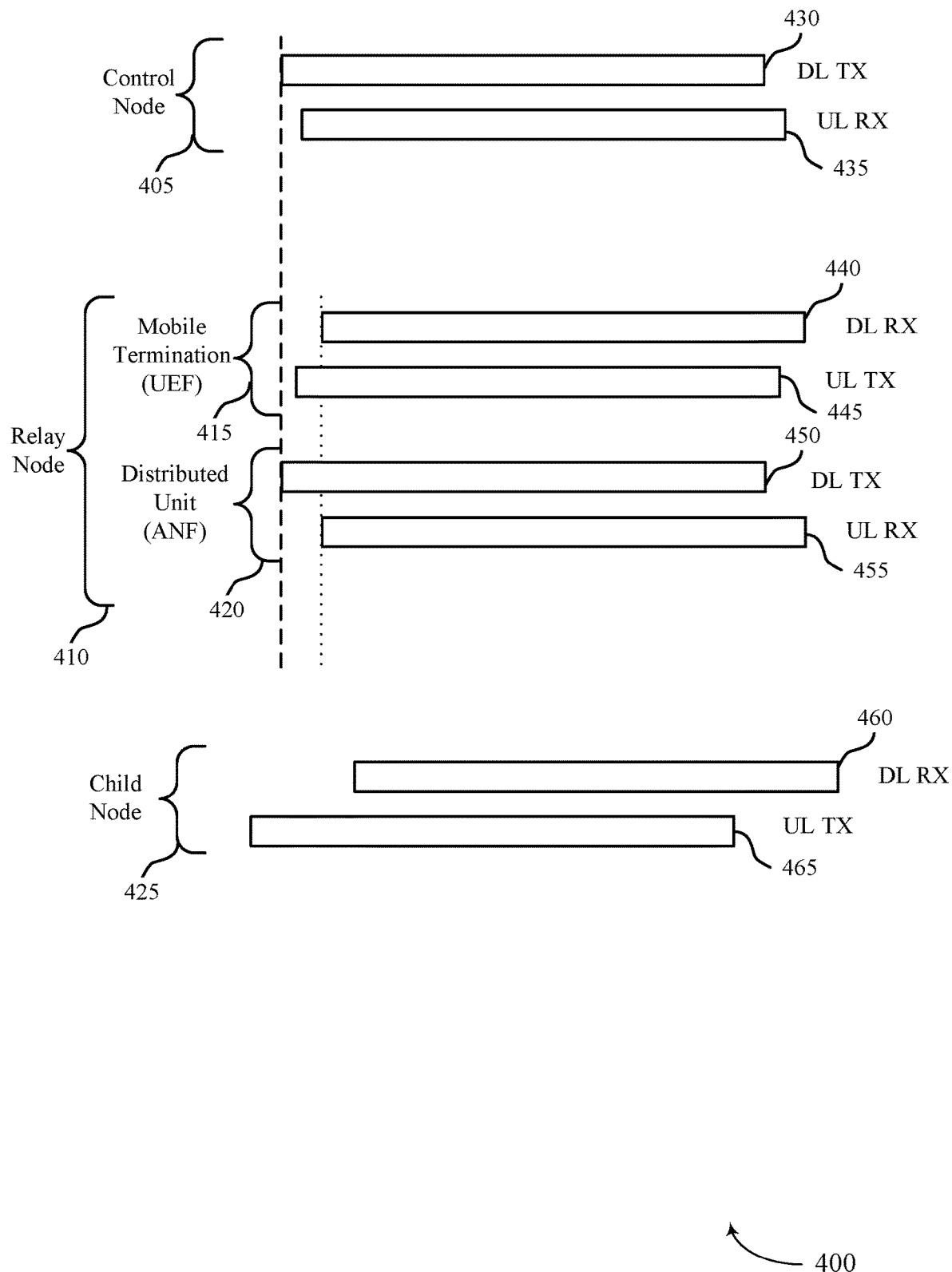
FIG. 4 illustrates an example of transmission timings of network nodes that support timing adjustment techniques in wireless communications in accordance with aspects of the present disclosure.

FIG. 4 illustrates an example of transmission timings of network nodes 400 that supports timing adjustment techniques in wireless communications in accordance with aspects of the present disclosure. In some examples, transmission timings of network nodes 400 may implement aspects of wireless communications system 100 or 200. In this example, a control node 405 (e.g., a DU 215 of FIG. 2 or a parent IAB node), may have an associated relay node 410 (e.g., an IAB relay 220 of FIG. 2). Further, the relay node 410 may have a mobile termination 415, such as a UEF, that manages communications with the control node 405, and a distributed unit (DU) 420, such as an ANF, that manages communications with one or more other nodes or UEs such as child node 425. In this example, the control node 405 may transmit downlink transmission 430 and receive uplink communications as indicated at uplink reception 435, where downlink transmission timing and uplink reception timing are not time aligned. The mobile termination 415 in this example has receives downlink communications as indicated at downlink reception 440, where a timing of the downlink reception 440 corresponds to the transmission time of the downlink transmission 430 plus a propagation delay between the control node 405 and the mobile termination 415. The mobile termination 415 may also transmit uplink transmission 445 to control node 405.

In this example, the DU 420 may transmit downlink transmission 450 to child node 425, which may receive the communication as downlink reception 460. The DU 420 may also receive an uplink transmission 465 from the child node as uplink reception 455. In this example, downlink transmission timings associated with downlink transmission 430 and downlink transmission 450 may be aligned. Further, within the relay node 410, receive timings of downlink reception 440 and the uplink reception 455 may be aligned. In examples such as FIG. 4, the timing within a node for transmissions and receptions may thus not be time aligned.

In such cases, in order to receive uplink communications that are time aligned with other received communications at a node, a timing adjustment may be provided to one or more other nodes that are to transmit the communications. Rather than indicating such a value in a TA command that is sent via higher-layer signaling (e.g., in a MAC-CE), a timing adjustment may be transmitted by a parent node in L1, or physical layer, signaling. In some cases, the timing adjustment may be provided to multiple child nodes in a single transmission, which may provide efficiencies through relatively low overhead and relatively low latency.

In some other cases, a cell (e.g., a relay in IAB) may have to change its uplink and/or downlink timing reference of its children (e.g., as a result of change in the backhaul network, such as when a child node receives a new TA from its parent node). In such cases, a new or updated timing adjustment may be signaled to child nodes, UEs, or both. Signaling of the updated timing adjustment in such cases may be performed as discussed above.

As discussed, the relay node 410 may align its uplink reception 455 timing to its downlink reception 440 timing (i.e., alignment of receptions from the control node 405 and the child node 425). In order to provide such an alignment, in some cases, the relay node 410 may determine a timing adjustment that is to be provided to the child node 425, which depends upon the propagation delay between the relay node 410 and the control node 405. Further, as indicated, downlink transmissions may be aligned across such a network, and thus the relay node 410 may determine timing for downlink transmission 450 based on the control node 405 timing of downlink transmission 430. In such a case, the relay node 410 may determine timing for downlink transmissions 450 based on a timing of the control node 405 downlink transmission 430 minus the propagation delay between the control node 405 and the relay node 410, which may be referred to as "d" or as a "timing adjustment" as discussed herein. Further, in such cases, the child node 425 may determine a timing for its uplink transmission 465 based on the timing of the control node 405 downlink transmission 430 plus d minus twice the propagation delay between the relay node 410 and the child node 425.

Thus, the child node 425 may receive two pieces of information in order to adjust the timing of the uplink transmission 465, namely the propagation delay between the child node 425 and the relay node 410 (which may be determined based on a TA value, for example), and the value of the timing adjustment, which depends on a propagation delay of a separate link. In some cases, the relay node 410 may provide the value of the timing adjustment to a number of child nodes 425 using a broadcast-type of indication as discussed herein. Further, in the event that the value of the timing adjustment changes, an indication of the updated value may be provided. As discussed, in some cases, physical layer signaling (e.g., L1 signaling) may be used to indicate the timing adjustment.

Figure 5:
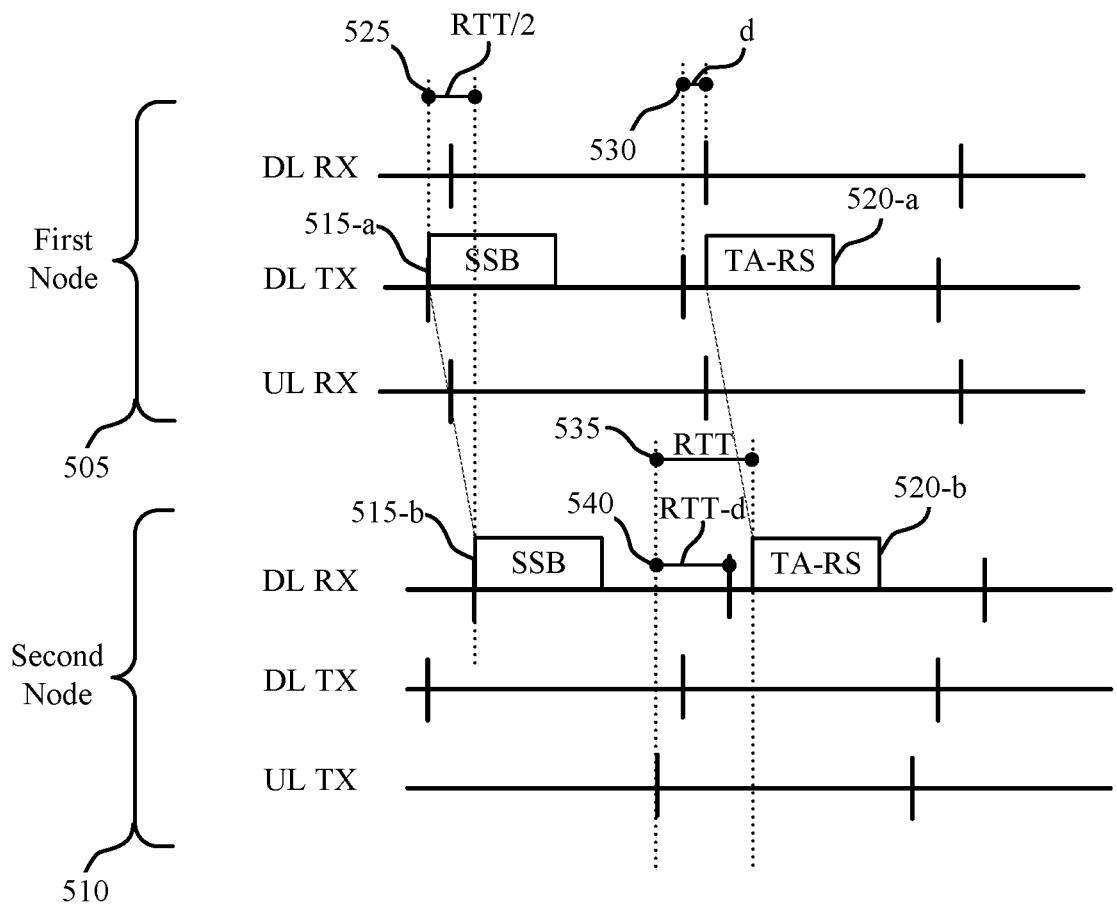
FIG. 5 illustrates an example of timing adjustment signaling that supports timing adjustment techniques in wireless communications in accordance with aspects of the present disclosure.

FIG. 5 illustrates an example of timing adjustment signaling 500 that supports timing adjustment techniques in wireless communications in accordance with aspects of the present disclosure. In some examples, timing adjustment signaling 500 may implement aspects of wireless communications system 100 or 200. In this example, a first node 505 may be a parent node in an IAB network, and a second node 510 may be a child node in the IAB network, although the techniques provided herein are applicable to any wireless network and are not limited to IAB networks.

In this example, the first node 505 may transmit a synchronization signal, which may be transmitted in a synchronization signal block (SSB) 515-$a$ that is transmitted according to an aligned downlink timing for downlink transmissions across the wireless network. The second node 510 may receive SSB 515-$b$ following a propagation delay 525, which may correspond to half of an RTT 535 between the first node 505 and the second node 510. The first node 505 may also transmit a physical layer signaling to indicate the timing adjustment, in the form of a timing adjustment reference signal (TA-RS) 520. The first node 505 may transmit the TA-RS at a time d 530, corresponding to the timing adjustment, after a frame/subframe boundary or other timing boundary that would otherwise align downlink transmissions. In some cases, the first node 505 may determine and configure a timing adjustment based on a mobility state of the first node 505 or the second node 510, or both. In some cases, a number of bits or a bitwidth of a timing adjustment may be based on an operating condition of the first node 505 or the second node 510, or both. The second node 510 may receive the TA-RS 520-$b$, and determine the timing adjustment based on the timing of the receipt of the TA-RS 520-$b$. In this case, based on the timing of the receipt of the SSB 515-$b$, the second node 510 may determine a frame/subframe boundary at which a subsequent downlink transmission would be expected to start, corresponding to RTT-d 540, and the difference between time of reception of TA-RS 520-$b$ and RTT-d 540 may be used to determine the timing adjustment value d 530. The second node 510 may then use this timing adjustment, in conjunction with any timing advance (e.g., as indicated with a TA command in a MAC-CE), to determine the timing for transmitting uplink transmissions to the first node 505.

In some cases, the TA-RS 520 may be transmitted using one or multiple signals, such as one or more reference signals (e.g., SSB, channel state information reference signal (CSI-RS), tracking reference signal (TRS), etc.) with the timing configuration to implicitly provide the timing adjustment value. In some cases, multiple signals may be transmitted that may indicate multiple different timing configurations (e.g., in cases where the second node 501 may have two or more connections with multiple parent nodes). In some cases, TA-RS 520 can be configured to be transmitted periodically, aperiodically, according to one or event-triggered events, on-demand based on a request from the second node 510, or any combinations thereof. In some cases, the system may use mmW transmissions, and TA-RS 520 can be beam-swept in all or a subset of directions. In some cases, TA-RS 520 can be cell-specific or UE-specifically configured. Additionally or alternatively, TA-RS 520 may be configured to be quasi-co-located (QCL) (e.g., spatially QCL) with other reference signals, such as SSB or CSI-RS, for example. Further, in some cases, one or multiple other nodes may be provided by the configuration along with resources for receiving TA-RS 520. In some cases, such configuration may be provided by, for example, a system information block (SIB), RRC signaling, a MAC-CE, upper-layer signaling, other signaling, or any combinations thereof.

In some examples, the first node 505 may determine whether to provide an indication of the timing adjustment in a DCI. In some cases, the timing adjustment may be explicitly indicated to the second node 510. Such an explicit indication may be provided, for example, via one or multiple adjustment commands provided in downlink control information (e.g., a group-common DCI). In some cases, such DCI may be scrambled by a specified identification that is associated with a timing adjustment (e.g., a TA-RNTI).

In some cases, an information field of a timing adjustment may be included in uplink grant scheduling (e.g., physical uplink shared channel). In some cases, an information field of a timing adjustment may be included in a downlink DCI (e.g., DCI transmitted in a physical downlink shared channel).

In some cases, an application timing of a timing adjustment may be similar to N2 timing (e.g., physical downlink control channel scheduling physical uplink shared channel timing), or N0+N1 timing (e.g., physical downlink control channel scheduling physical downlink shared channel and physical downlink shared channel versus HARQ ACK).

From the point of view of the second node 510, monitoring may be performed and one or more TA-RS 520 transmissions may be received, and the timing adjustment(s) determined. In some cases, the second node 510 may monitor for DCI (e.g., carrying explicit timing adjustment information), one or more other reference signals (e.g., SSB, CSI-RS), one or more MAC-CE TA commands, of combinations thereof, and may determine one or multiple timing adjustment values based at least in part on these receptions. In some cases, the time adjustment may be used for communication with the first node 505, or for communication with a different node (e.g., a third node or a transmission adjustment of a next hop). In cases where multiple timing adjustments are provided, the second node 510 may adopt different timings based on types of signals or allocated resources (e.g., on some resources may provide frequency division multiplexing (FDM) or spatial division multiplexing (SDM) communications other nodes, and hence a different timing adjustment), for communications with multiple nodes, or combinations thereof.

Figure 6:
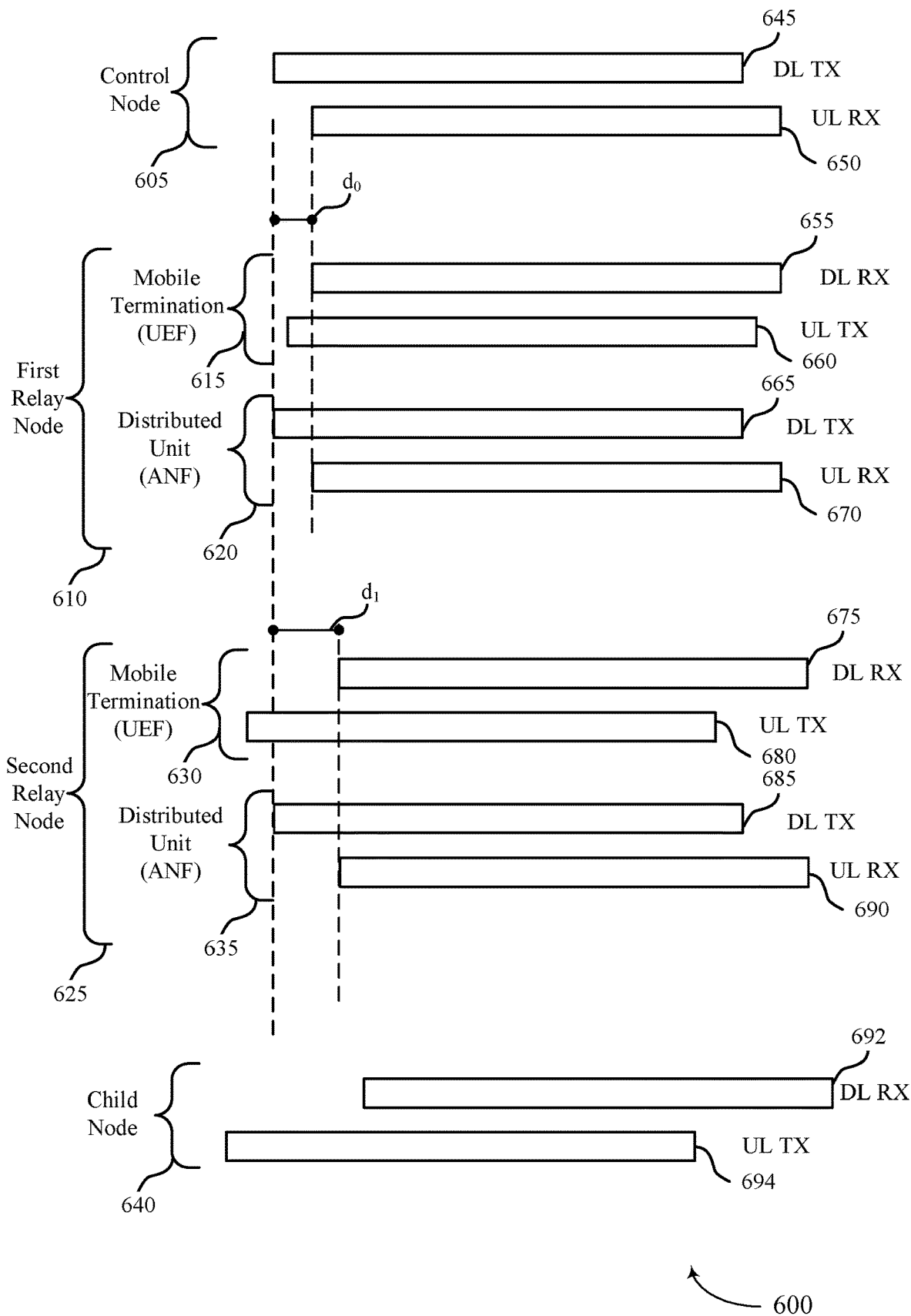
FIG. 6 illustrates an example of transmission timings of network nodes that support timing adjustment techniques in wireless communications in accordance with aspects of the present disclosure.

FIG. 6 illustrates an example of a transmission timings of network nodes 600 that supports timing adjustment techniques in wireless communications in accordance with aspects of the present disclosure. In some examples, transmission timings of network nodes 600 may implement aspects of wireless communications system 100 or 200. In this example, similarly as in the example of FIG. 4, a control node 605 (e.g., a DU 215 of FIG. 2 or a parent IAB node), may have an associated first relay node 610 and a second relay node 625 (e.g., IAB relays 220 of FIG. 2). Further, the first relay node 610 may have a mobile termination 615, such as a UEF, that manages communications with the control node 605, and a distributed unit (DU) 620, such as an ANF, that manages communications with one or more other nodes or UEs such as second relay node 625. The second relay node 625 may also have a mobile termination 630, such as a UEF, that manages communications with the first relay node 610, and a distributed unit (DU) 635, such as an ANF, that manages communications with one or more other nodes or UEs such as child node 640.

In this example, the control node 605 may transmit downlink transmission 645 and receive uplink communications as indicated at uplink reception 650, where downlink transmission timing and uplink reception timing are not time aligned. The mobile termination 615 in this example has receives downlink communications as indicated at downlink reception 655, where a timing of the downlink reception 655 corresponds to the transmission time of the downlink transmission 645 plus a propagation delay between the control node 605 and the mobile termination 615. The mobile termination 615 may also transmit uplink transmission 660 to control node 605.

In this example, the DU 620 may transmit downlink transmission 665 to second relay node 625, which may receive the communication as downlink reception 675. The DU 620 may also receive an uplink transmission 680 from the second relay node 625 as uplink reception 670. In this example, downlink transmission timings associated with downlink transmission 665 and downlink transmission 645, as well as downlink transmission 685 of second relay node 625, may be aligned. Further, within the first relay node 610, receive timings of downlink reception 655 and the uplink reception 670 may be aligned. In examples such as FIG. 6, the timing within a node for transmissions and receptions may thus not be time aligned.

In this example, DU 620 may transmit downlink transmission 665 and receive uplink communications as indicated at uplink reception 670, where downlink transmission timing and uplink reception timing are not time aligned. The mobile termination 630 in this example has receives downlink communications as indicated at downlink reception 675, where a timing of the downlink reception 675 corresponds to the transmission time of the downlink transmission 665 plus a propagation delay between the first relay node 610 and the mobile termination 630. The mobile termination 630 may also transmit uplink transmission 680 to the first relay node 610.

In this example, the DU 635 may transmit downlink transmission 685 to child node 640, which may receive the communication as downlink reception 692. The DU 635 may also receive an uplink transmission 694 from the child node as uplink reception 690.

In this example, downlink transmission timings associated with downlink transmission 645, downlink transmission 665, and downlink transmission 685 may be aligned. Further, within the first relay node 610, receive timings of downlink reception 655 and the uplink reception 670 may be aligned, and within the second relay node 625, receive timings of downlink reception 675 and the uplink reception 690 may be aligned. Thus, in examples such as FIG. 6, the timing within a node for transmissions and receptions may thus not be time aligned.

In such cases, as discussed above, in order to receive uplink communications that are time aligned with other received communications at a node, a timing adjustment may be provided by each of the first relay node 610 and the second relay node 625 to one or more other nodes that are to transmit the communications. Signaling of the timing adjustments, and any updates to timing adjustments, in such cases may be performed as discussed above.

Figure 7:
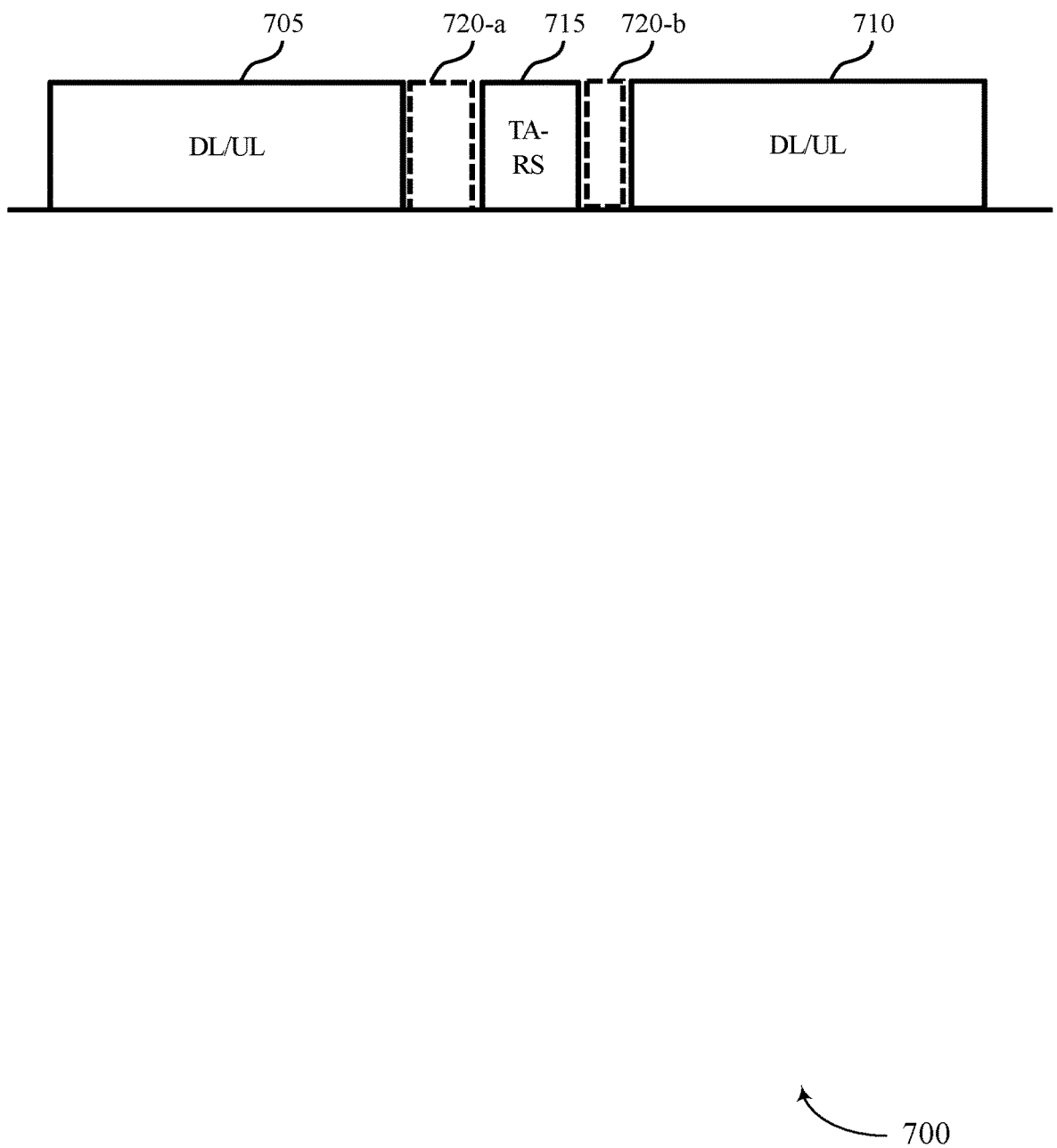
FIG. 7 illustrates an example of a guard period for a timing adjustment signal that supports timing adjustment techniques in wireless communications in accordance with aspects of the present disclosure.

FIG. 7 illustrates an example of a guard period for a timing adjustment signal 700 that supports timing adjustment techniques in wireless communications in accordance with aspects of the present disclosure. In some examples, guard period for a timing adjustment signal 700 may implement aspects of wireless communications system 100 or 200. In this example, physical layer signaling of a TA-RS 715 may be used to provide an indication of a timing adjustment by a wireless node.

In this example, such a TA-RS 715 may be transmitted between other downlink/uplink (DL/UL) transmissions, such as DL/UL transmissions 705 and DL/UL transmissions 710. In such cases, since TA-RS 715 may be transmitted with a different timing reference than other signals, a guard period 720 may be provided that is associated with the TA-RS 7125. In the example, of FIG. 7, a first portion of guard period 720-a may be provided before TA-RS 715, and a second portion of guard period 720-b may be provided after the TA-RS 715. In some cases, the amount of guard period 720 provided may be determined based on a timing misalignment between consecutive symbols. In some cases, a control node may provide an indication of the guard period 720 to other node(s). In some cases, the amount of guard period 720 may be equal to an integer number of symbols or a fraction of symbol. Additionally or alternatively, a CP size, a SCS, or combinations thereof, can be configured and indicated with configuration information for TA-RS 715, in which a CP, SCS, or combinations thereof may be different from neighboring symbols.

Figure 8:
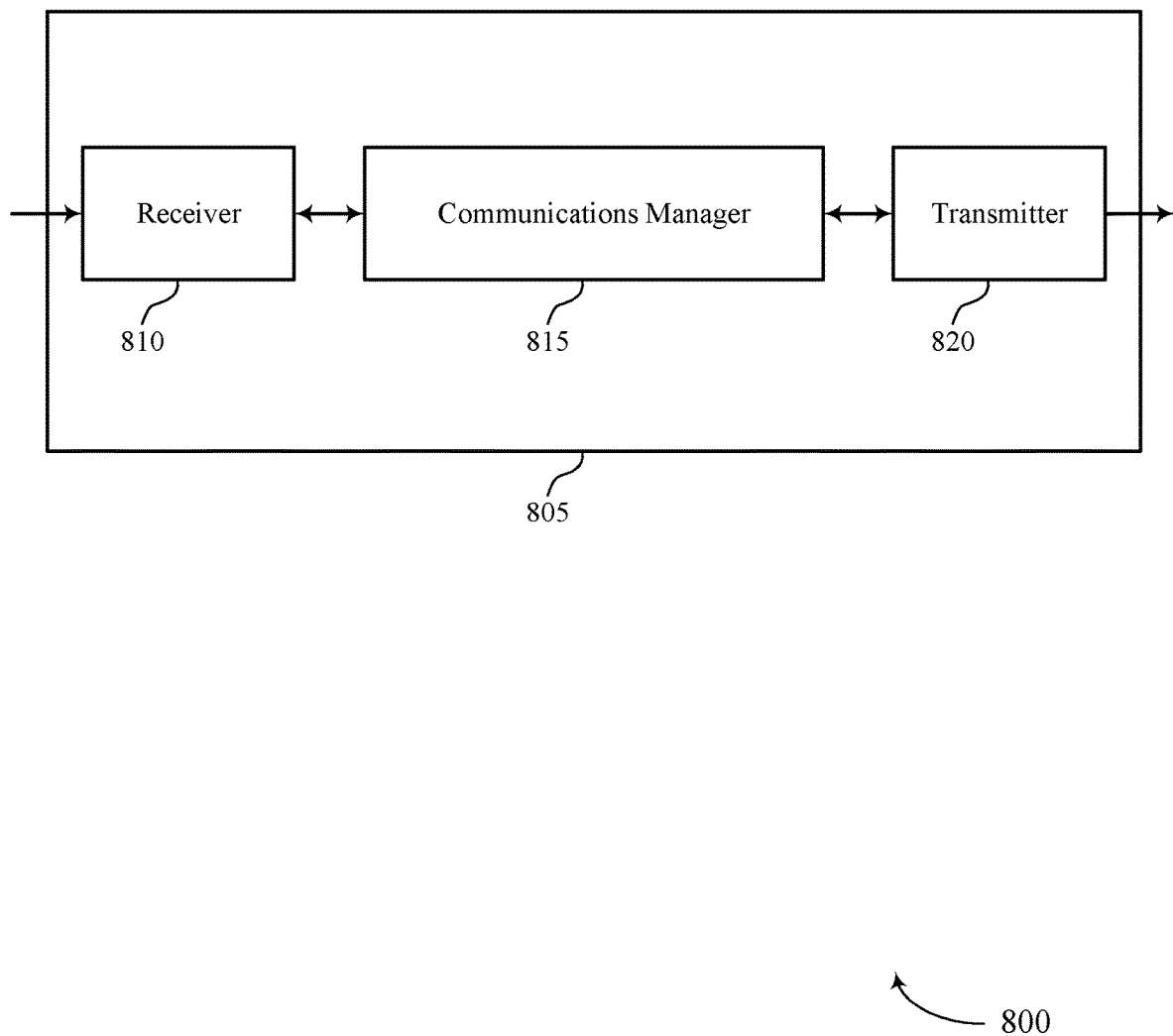
FIGS. 8 and 9 show block diagrams of devices that support timing adjustment techniques in wireless communications in accordance with aspects of the present disclosure.

FIG. 8 shows a block diagram 800 of a device 805 that supports timing adjustment techniques in wireless communications in accordance with aspects of the present disclosure. The device 805 may be an example of aspects of a UE 115 or base station 105 as described herein. The device 805 may include a receiver 810, a communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to timing adjustment techniques in wireless communications, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may receive, at a second wireless node from a first wireless node, a first indication of a first timing adjustment value via physical layer signaling, determine, based on the first indication of the first timing adjustment value, a first timing reference for communications with at least one of the first wireless node or a third wireless node, and communicate with at least one of the first wireless node or the third wireless node based on the first timing reference. The communications manager 815 may be an example of aspects of the communications manager 1110 or 1210 as described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
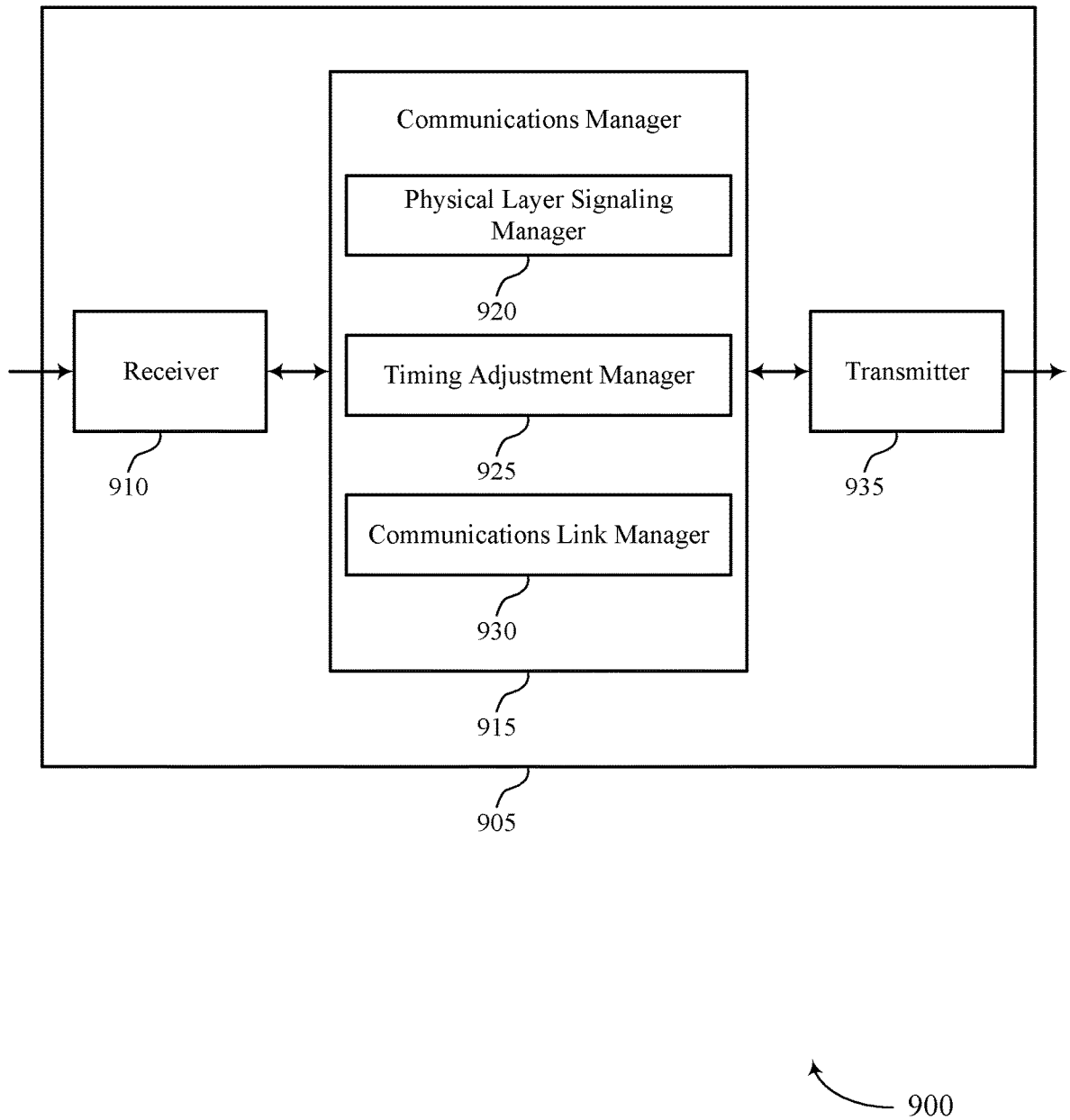

FIG. 9 shows a block diagram 900 of a device 905 that supports timing adjustment techniques in wireless communications in accordance with aspects of the present disclosure. The device 905 may be an example of aspects of a device 805, a UE 115, or a base station 105 as described herein. The device 905 may include a receiver 910, a communications manager 915, and a transmitter 935. The device 905 may also include a processor. Each of these components may be in communication with one another (e.g., via one or more buses).

Receiver 910 may receive information such as packets, user data, or control information associated with various information channels (e.g., control channels, data channels, and information related to timing adjustment techniques in wireless communications, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may be an example of aspects of the communications manager 815 as described herein. The communications manager 915 may include a physical layer signaling manager 920, a timing adjustment manager 925, and a communications link manager 930. The communications manager 915 may be an example of aspects of the communications manager 1110 or 1210 as described herein.

The physical layer signaling manager 920 may receive, at a second wireless node from a first wireless node, a first indication of a first timing adjustment value via physical layer signaling.

The timing adjustment manager 925 may determine, based on the first indication of the first timing adjustment value, a first timing reference for communications with at least one of the first wireless node or a third wireless node.

The communications link manager 930 may communicate with at least one of the first wireless node or the third wireless node based on the first timing reference.

Transmitter 935 may transmit signals generated by other components of the device 905. In some examples, the transmitter 935 may be collocated with a receiver 910 in a transceiver module. For example, the transmitter 935 may be an example of aspects of the transceiver 1120 or 1220 as described with reference to FIGS. 11 and 12. The transmitter 935 may utilize a single antenna or a set of antennas.

Figure 10:
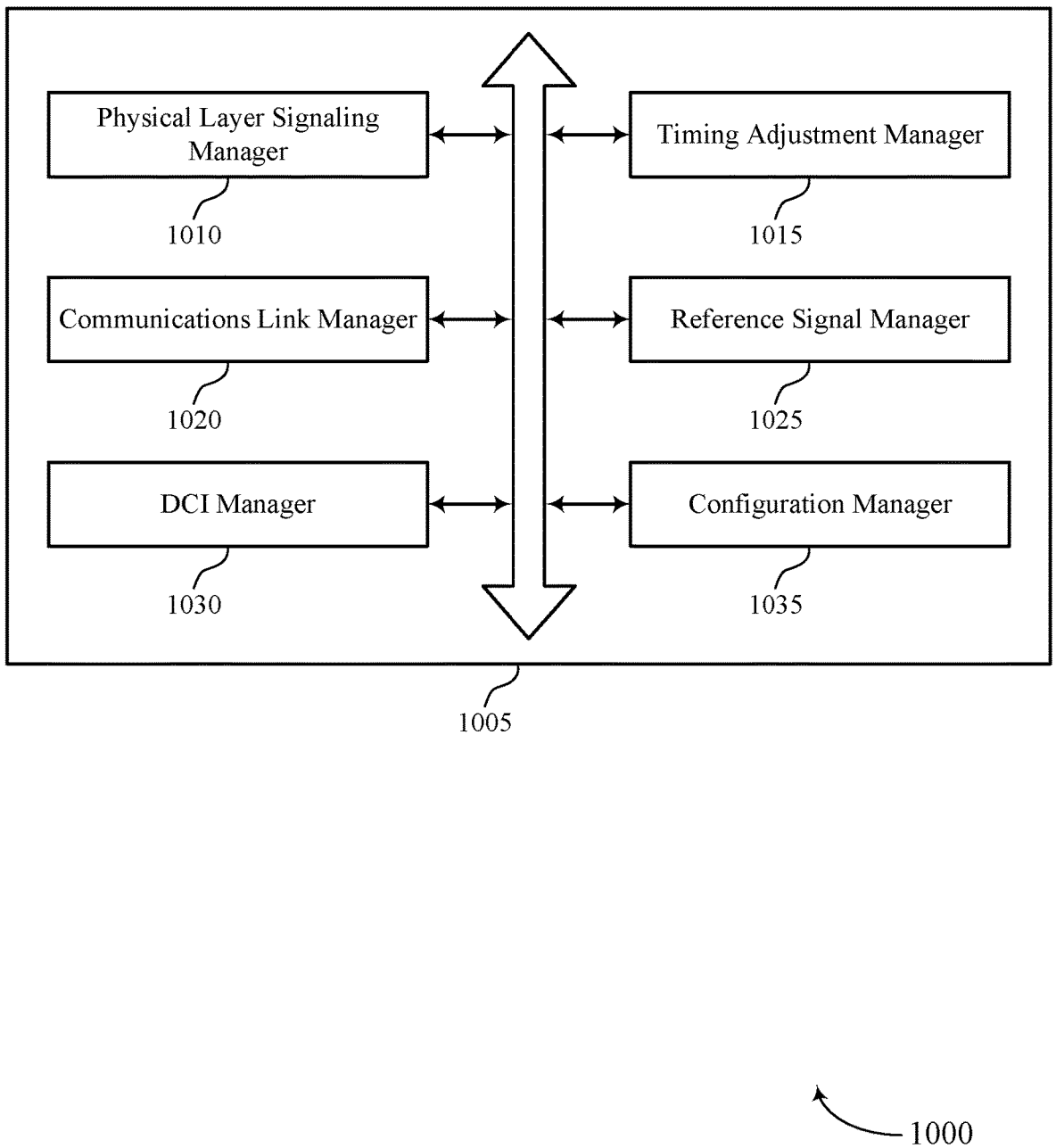
FIG. 10 shows a block diagram of a communications manager that supports timing adjustment techniques in wireless communications in accordance with aspects of the present disclosure.

FIG. 10 shows a block diagram 1000 of a communications manager 1005 that supports timing adjustment techniques in wireless communications in accordance with aspects of the present disclosure. The communications manager 1005 may be an example of aspects of a communications manager 815, a communications manager 915, or a communications manager 1110 described herein. The communications manager 1005 may include a physical layer signaling manager 1010, a timing adjustment manager 1015, a communications link manager 1020, a reference signal manager 1025, a DCI manager 1030, and a configuration manager 1035. Each of these modules may communicate, directly or indirectly, with one another (e.g., via one or more buses).

The physical layer signaling manager 1010 may receive, at a second wireless node from a first wireless node, a first indication of a first timing adjustment value via physical layer signaling. In some examples, the physical layer signaling manager 1010 may receive a second indication of a second timing adjustment value from the first wireless node via MAC, RRC signaling, or combinations thereof, where the second timing adjustment value is based on a propagation delay for communications between the first wireless node and the second wireless node. In some cases, the physical layer signaling used to transmit the first indication of the first timing adjustment value has a first CP, SCS, or combination thereof, that is different than a second CP, second SCS, or combination thereof, of one or more other adjacent signals communicated with the first wireless node, and where the physical layer signaling includes L1 signaling.

The timing adjustment manager 1015 may determine, based on the first indication of the first timing adjustment value, a first timing reference for communications with at least one of the first wireless node or a third wireless node. In some examples, the timing adjustment manager 1015 may provide a timing adjustment that is further based on a second timing adjustment value (e.g., a TA value provided in a MAC-CE). In some cases, the first indication is an implicit indication of the first timing adjustment value. In some cases, the first indication is an explicit indication of the first timing adjustment value.

The communications link manager 1020 may communicate with at least one of the first wireless node or the third wireless node based on the first timing reference. In some examples, the communications link manager 1020 may communicate with the first wireless node using a first set of signals or resources based on the first timing reference. In some examples, the communications link manager 1020 may communicate with the first wireless node using a second set of signals or resources based on a second timing reference that is different than the first timing reference.

The reference signal manager 1025 may receive a reference signal that provides the first indication of the first timing adjustment value. In some cases, a difference between a first timing of the reference signal and a second timing of one or more other downlink transmissions corresponds to the first timing adjustment value. In some cases, the reference signal is a TA-RS. In some cases, the reference signal is one or more of a synchronization signal, a CSI-RS, a TRS, or any combinations thereof, and where a timing of the transmission of the reference signal provides the first indication of the first timing adjustment value. In some cases, the reference signal is a periodic reference signal, an aperiodic reference signal, an event-based reference signal, or an on-demand reference signal that is transmitted responsive to a request from the second wireless node to the first wireless node. In some cases, the reference signal is QCL with one or more other reference signals.

The DCI manager 1030 may receive downlink control information that includes the explicit indication of the first timing adjustment value. In some cases, the downlink control information includes a GC-DCI transmission.

The configuration manager 1035 may receive, from the first wireless node, configuration information for monitoring for the first indication of the first timing adjustment value. In some cases, the configuration information includes one or more of a SIB, RRC signaling, a MAC-CE, or other higher layer signaling that includes configuration information monitoring for the first indication of the first timing adjustment value.

Figure 11:
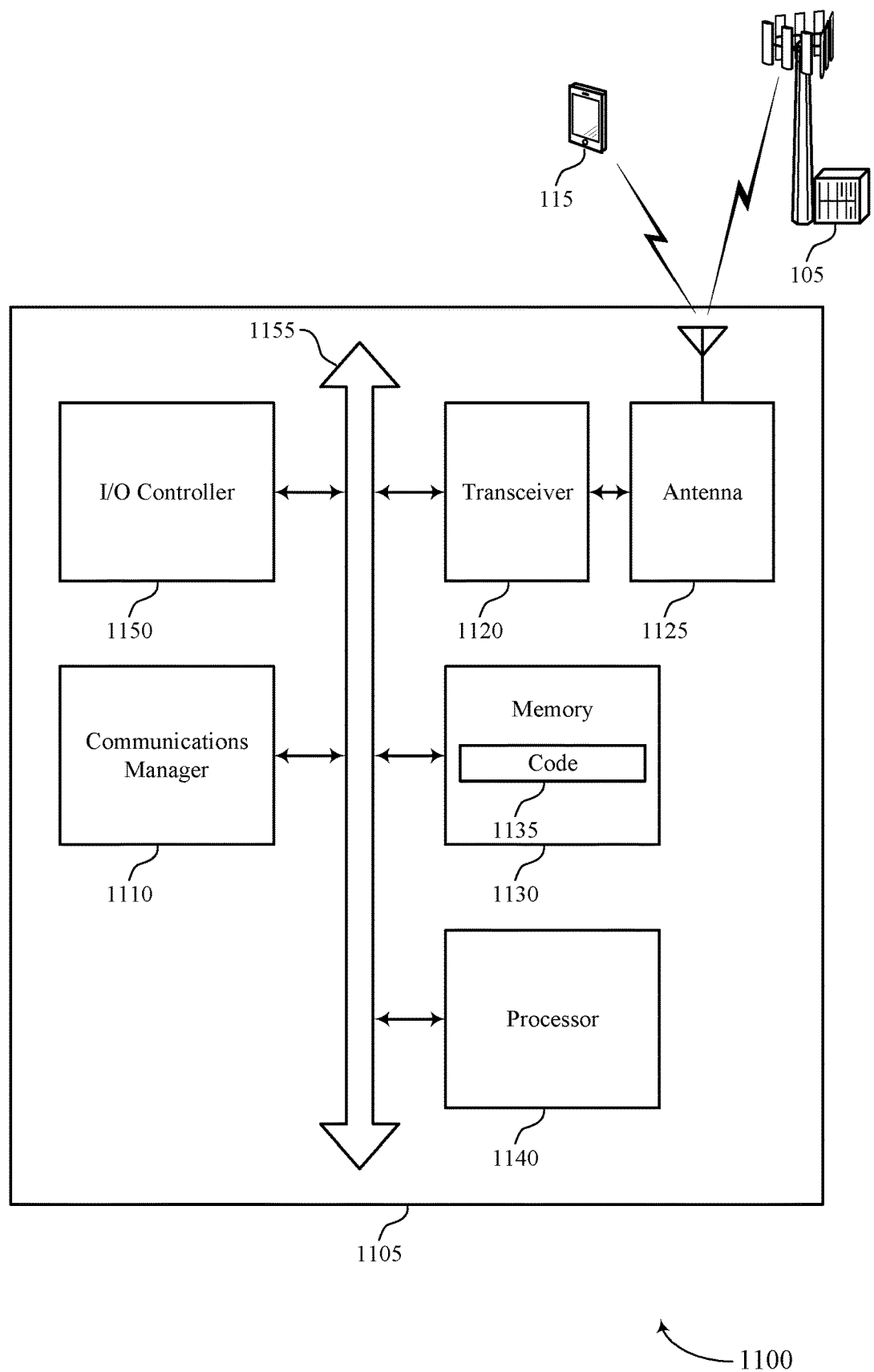
FIG. 11 shows a diagram of a system including a user equipment (UE) that supports timing adjustment techniques in wireless communications in accordance with aspects of the present disclosure.

FIG. 11 shows a diagram of a system 1100 including a device 1105 that supports timing adjustment techniques in wireless communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may receive, at a second wireless node from a first wireless node, a first indication of a first timing adjustment value via physical layer signaling, determine, based on the first indication of the first timing adjustment value, a first timing reference for communications with at least one of the first wireless node or a third wireless node, and communicate with at least one of the first wireless node or the third wireless node based on the first timing reference.

Transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting timing adjustment techniques in wireless communications).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
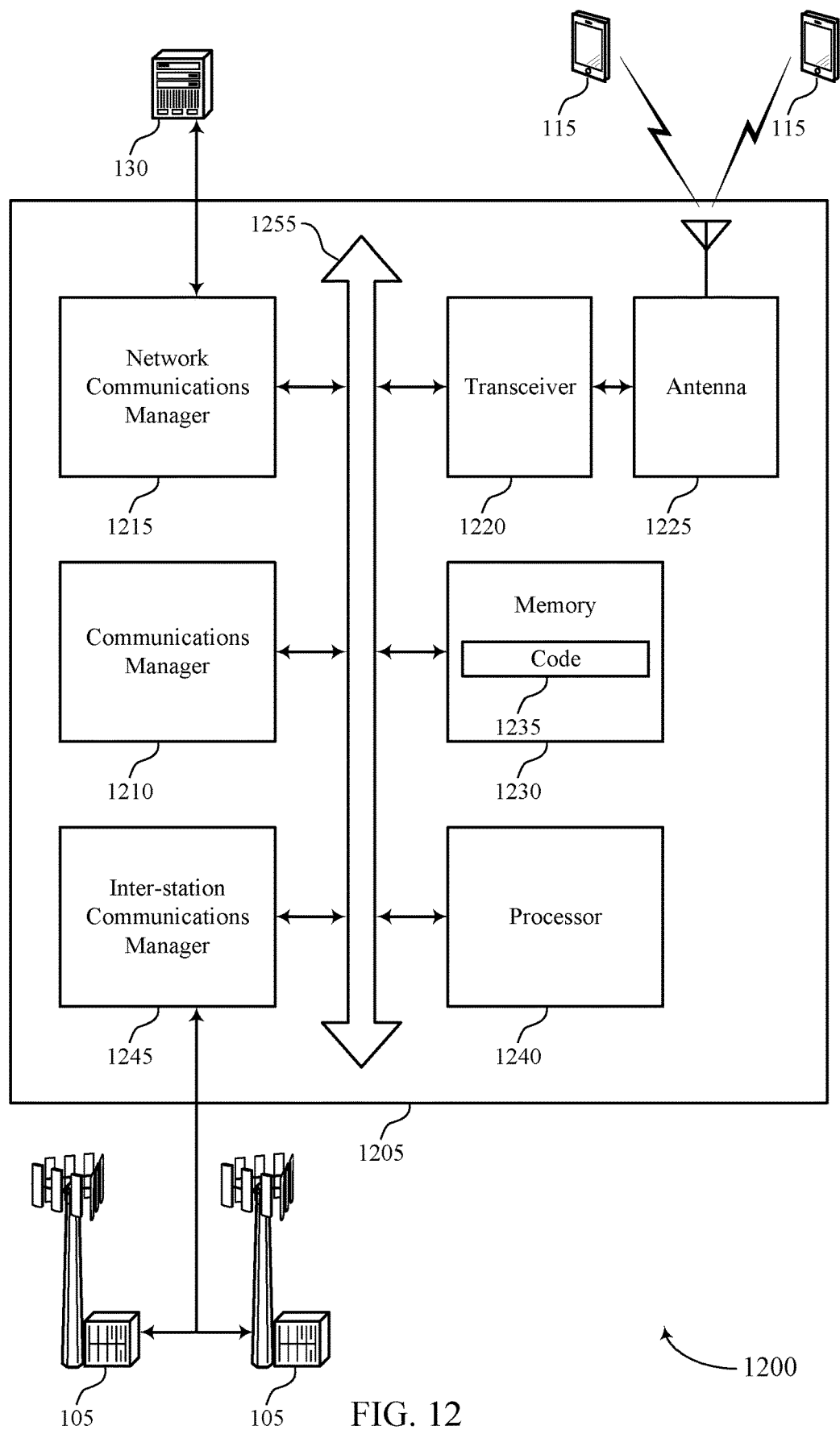
FIG. 12 shows a diagram of a system including a base station that supports timing adjustment techniques in wireless communications in accordance with aspects of the present disclosure.

FIG. 12 shows a diagram of a system 1200 including a device 1205 that supports timing adjustment techniques in wireless communications in accordance with aspects of the present disclosure. The device 1205 may be an example of or include the components of device 805, device 905, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may receive, at a second wireless node from a first wireless node, a first indication of a first timing adjustment value via physical layer signaling, determine, based on the first indication of the first timing adjustment value, a first timing reference for communications with at least one of the first wireless node or a third wireless node, and communicate with at least one of the first wireless node or the third wireless node based on the first timing reference.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting timing adjustment techniques in wireless communications).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
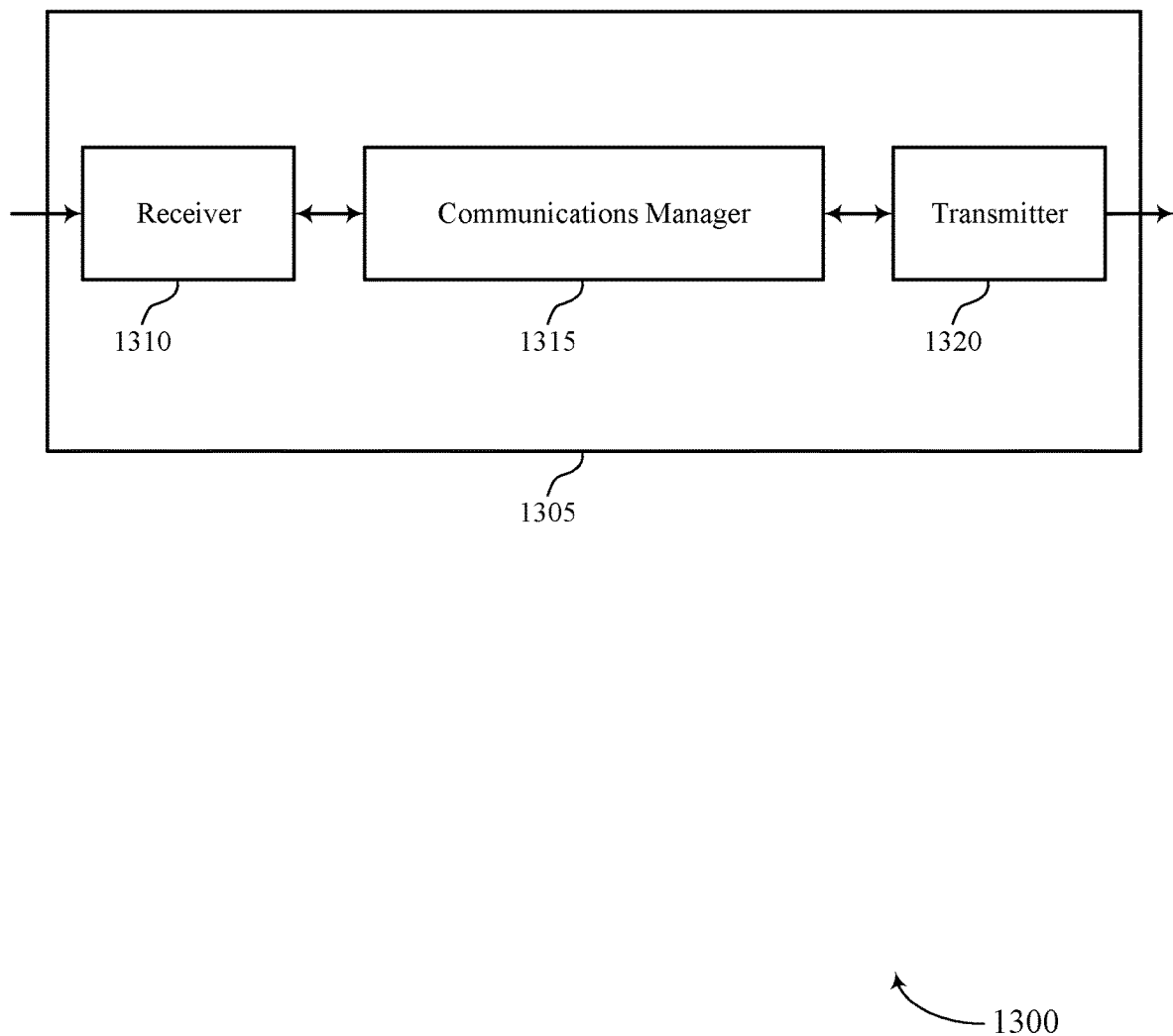
FIGS. 13 and 14 show block diagrams of devices that support timing adjustment techniques in wireless communications in accordance with aspects of the present disclosure.

FIG. 13 shows a block diagram 1300 of a device 1305 that supports timing adjustment techniques in wireless communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to timing adjustment techniques in wireless communications, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify, at a first wireless node, a first timing adjustment value for a first timing reference of a second wireless node and transmit a first indication of the first timing adjustment value to the second wireless node via physical layer signaling. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
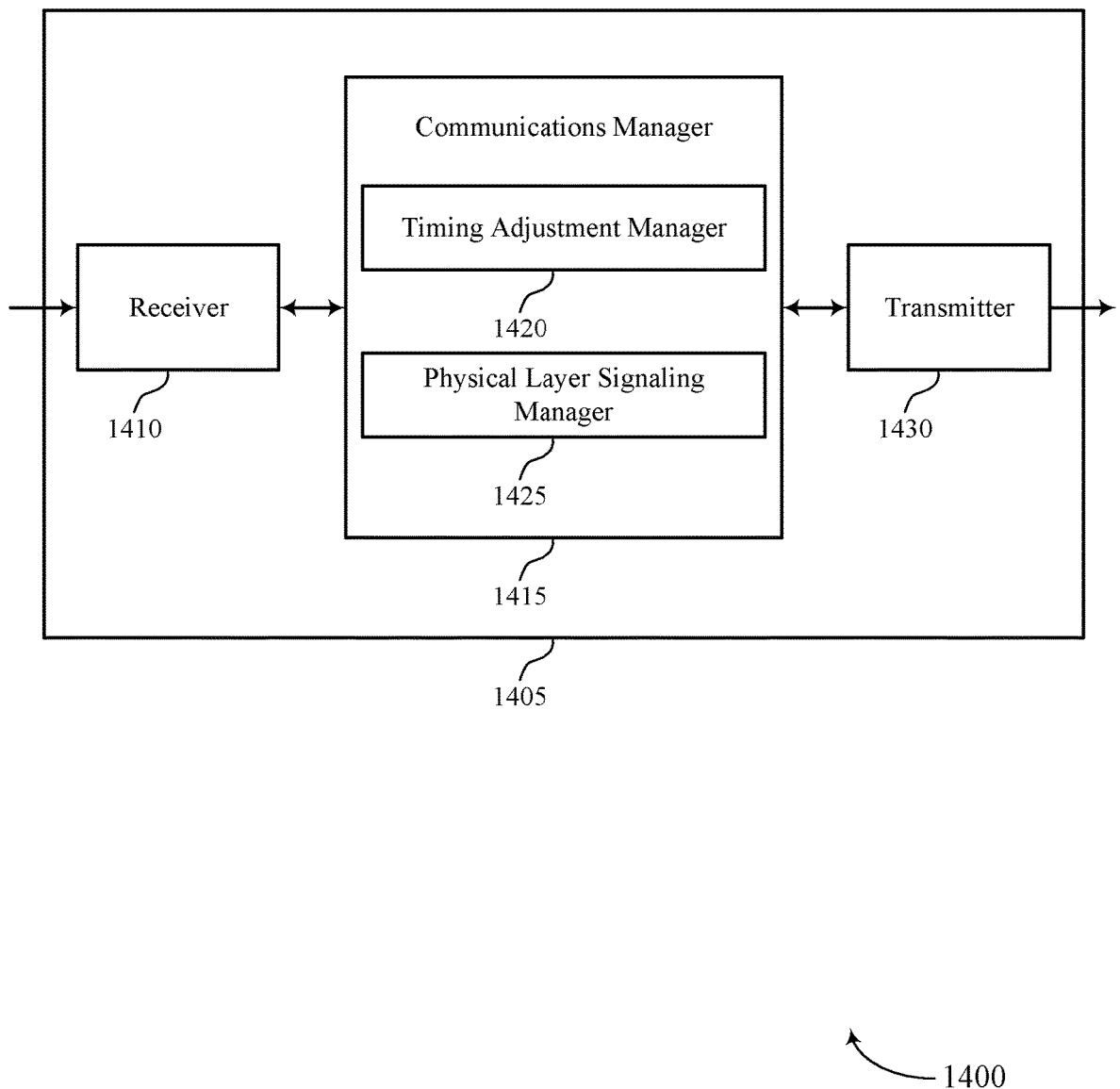

FIG. 14 shows a block diagram 1400 of a device 1405 that supports timing adjustment techniques in wireless communications in accordance with aspects of the present disclosure. The device 1405 may be an example of aspects of a device 1305, or a base station 105 as described herein. The device 1405 may include a receiver 1410, a communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to timing adjustment techniques in wireless communications, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a timing adjustment manager 1420 and a physical layer signaling manager 1425. The communications manager 1415 may be an example of aspects of the communications manager 1610 described herein.

The timing adjustment manager 1420 may identify, at a first wireless node, a first timing adjustment value for a first timing reference of a second wireless node.

The physical layer signaling manager 1425 may transmit a first indication of the first timing adjustment value to the second wireless node via physical layer signaling.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
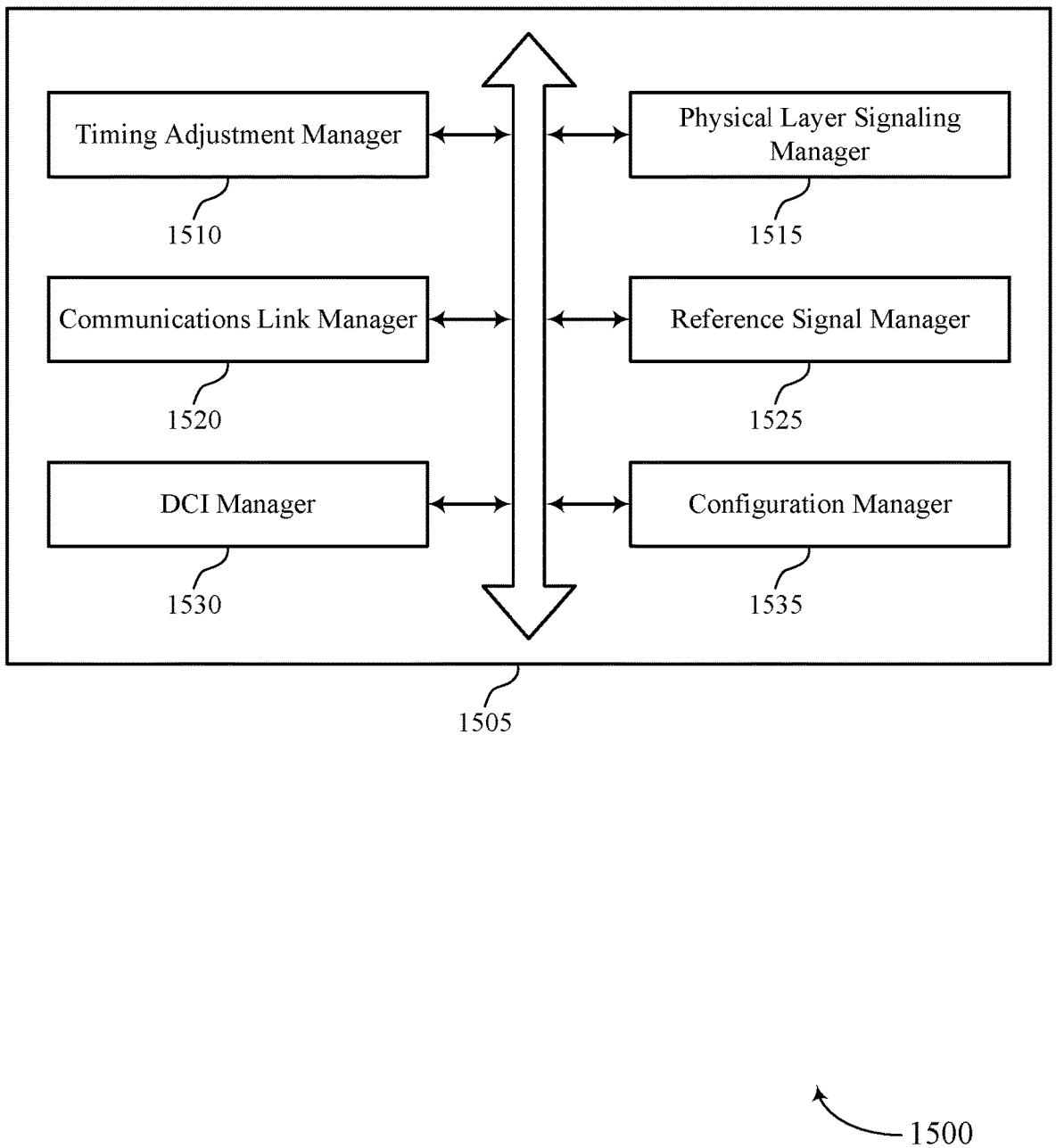
FIG. 15 shows a block diagram of a communications manager that supports timing adjustment techniques in wireless communications in accordance with aspects of the present disclosure.

FIG. 15 shows a block diagram 1500 of a communications manager 1505 that supports timing adjustment techniques in wireless communications in accordance with aspects of the present disclosure. The communications manager 1505 may be an example of aspects of a communications manager 1315, a communications manager 1415, or a communications manager 1610 described herein. The communications manager 1505 may include a timing adjustment manager 1510, a physical layer signaling manager 1515, a communications link manager 1520, a reference signal manager 1525, a DCI manager 1530, and a configuration manager 1535. Each of these modules may communicate, directly or indirectly, with one another (e.g., via one or more buses).

The timing adjustment manager 1510 may identify, at a first wireless node, a first timing adjustment value for a first timing reference of a second wireless node. In some examples, the timing adjustment manager 1510 may receive, at the first wireless node, an updated first timing advance from the parent node, where the updated first timing advance is based on a change in the timing advance between the first wireless node and the parent node in the IAB network. In some examples, an updated first timing advance may be provided in an updated indication of the first timing adjustment value to the second wireless node via the physical layer signaling, where the physical layer signaling includes L1 signaling. In some cases, the second wireless node and the first wireless node are nodes in an IAB network, and where the first timing adjustment value is based on distance between relay nodes in the IAB network. In some cases, the first timing adjustment value is provided to the first wireless node, and one or more other wireless nodes, by a control node. In some cases, the first wireless node is a relay node in an IAB network, and where the first timing adjustment value is based on a first timing advance between the first wireless node and a parent node in the IAB network.

The physical layer signaling manager 1515 may transmit a first indication of the first timing adjustment value to the second wireless node via physical layer signaling. In some examples, the physical layer signaling manager 1515 may transmit a second indication of a second timing adjustment value to the second wireless node via MAC, RRC signaling, or combinations thereof, where the second timing adjustment value is based on a propagation delay for communication between the first wireless node and the second wireless node.

In some cases, the first indication is an implicit indication of the first timing adjustment value. In some cases, the physical layer signaling used to transmit the first indication of the first timing adjustment value includes L1 signaling, and has a first CP or SCS that is different than a second CP or second SCS of one or more other adjacent signals communicated by the first wireless node. In some cases, the first indication is an explicit indication of the first timing adjustment value (e.g., transmitted via GC-DCI). The communications link manager 1520 may communicate with the second wireless node based on the second timing adjustment value.

The reference signal manager 1525 may transmit a reference signal that provides the first indication to the second wireless node and one or more other wireless nodes. In some examples, the reference signal manager 1525 may configure a guard period around the physical layer signaling. In some examples, the first indication of the first timing adjustment value may be transmitted within a guard period, where the physical layer signaling includes L1 signaling. In some cases, a difference between a first timing of the reference signal transmission and a second timing of one or more other downlink transmissions corresponds to the first timing adjustment value. In some cases, the reference signal is a TA-RS. In some cases, the reference signal is one or more of a synchronization signal, a CSI-RS, a TRS, or any combinations thereof, and where a timing of the transmission of the reference signal provides the first indication of the first timing adjustment value.

In some cases, the reference signal is a periodic reference signal, an aperiodic reference signal, an event-based reference signal, or an on-demand reference signal that is transmitted responsive to a request from the second wireless node. In some cases, the reference signal is transmitted in one or more beamformed transmission beams across all or a portion of a coverage area of the first wireless node. In some cases, the reference signal is a cell-specific reference signal associated with the first wireless node. In some cases, the reference signal is QCL with one or more other reference signals. In some cases, the guard period is based on a time difference between the L1 physical layer signaling that provides the first indication of the first timing adjustment value and a timing of one or more other communications with the second wireless node. In some cases, the guard period is configured by a control node in communication with the first wireless node. In some cases, a duration of the guard period corresponds to an integer number of symbols or a fraction of a symbol.

The DCI manager 1530 may transmit downlink control information that includes the explicit indication of the first timing adjustment value. In some examples, the DCI manager 1530 may scramble the downlink control information using a scrambling identification that corresponds to the first timing reference. In some cases, the downlink control information includes a GC-DCI transmission.

The configuration manager 1535 may configure the second wireless node to receive the first indication of the first timing adjustment value. In some examples, the configuration manager 1535 may transmit one or more of a SIB, RRC signaling, a MAC-CE, other higher layer signaling, or any combinations thereof, that includes configuration information for the second wireless node to receive the first indication of the first timing adjustment value.

Figure 16:
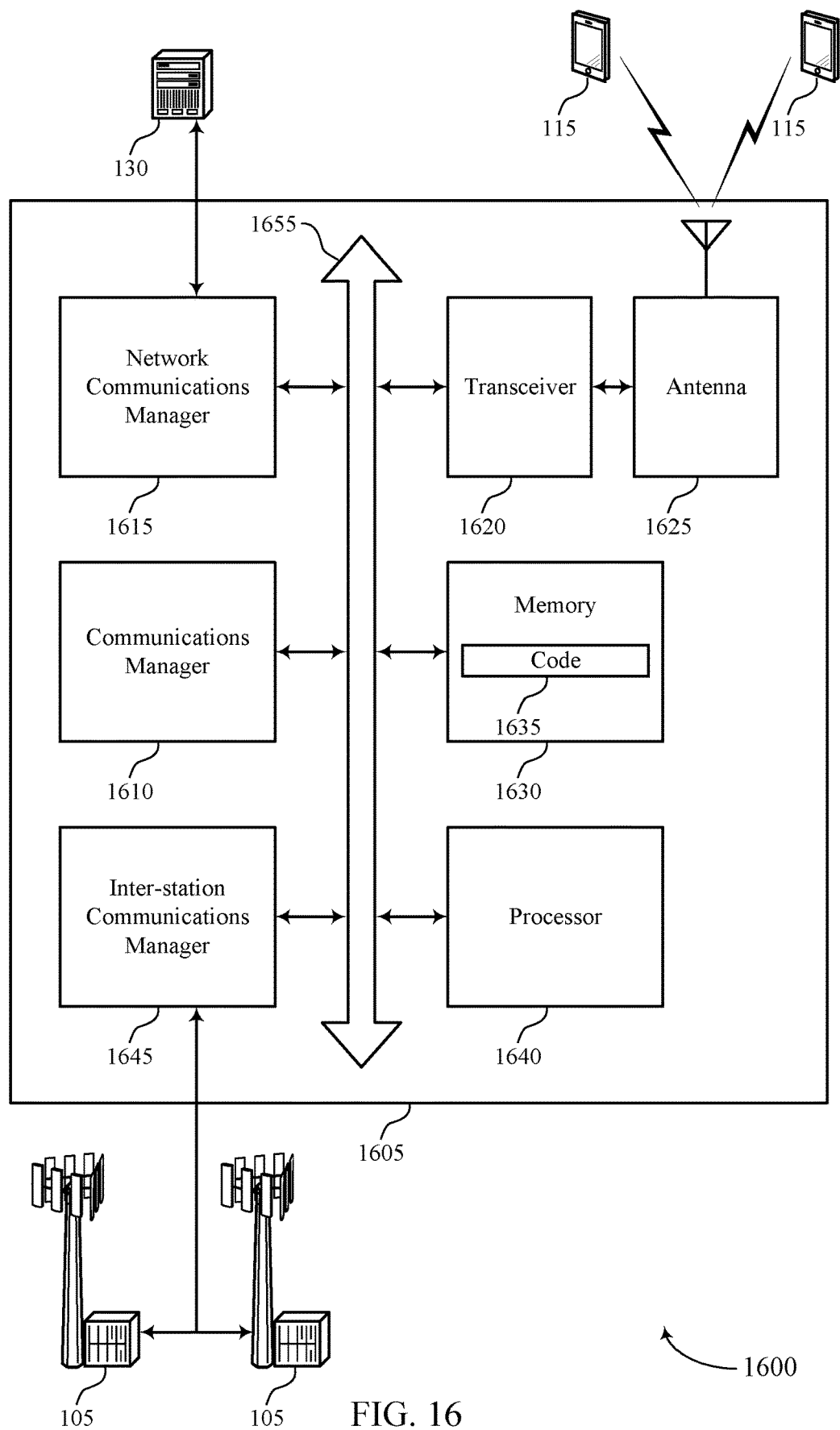
FIG. 16 shows a diagram of a system including a device that supports timing adjustment techniques in wireless communications in accordance with aspects of the present disclosure.

FIG. 16 shows a diagram of a system 1600 including a device 1605 that supports timing adjustment techniques in wireless communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1655).

The communications manager 1610 may identify, at a first wireless node, a first timing adjustment value for a first timing reference of a second wireless node and transmit a first indication of the first timing adjustment value to the second wireless node via physical layer signaling.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting timing adjustment techniques in wireless communications).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
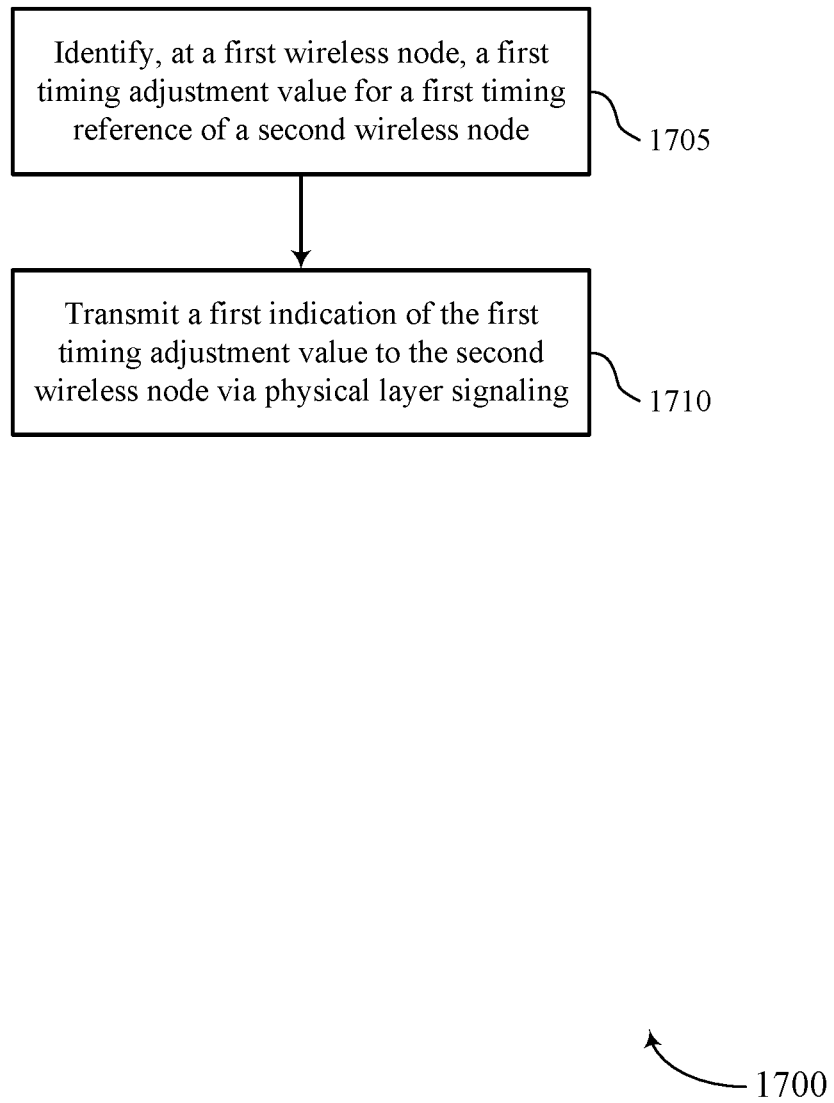
FIGS. 17 through 25 show flowcharts illustrating methods that support timing adjustment techniques in wireless communications in accordance with aspects of the present disclosure.

FIG. 17 shows a flowchart illustrating a method 1700 that supports timing adjustment techniques in wireless communications in accordance with aspects of the present disclosure. The operations of method 1700 may be implemented by a base station 105 or its components as described herein. For example, the operations of method 1700 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 1705, the base station may be a first wireless node and may identify a first timing adjustment value for a first timing reference of a second wireless node. The operations of 1705 may be performed according to the methods described herein. In some examples, aspects of the operations of 1705 may be performed by a timing adjustment manager as described with reference to FIGS. 13 through 16.

At 1710, the base station may transmit a first indication of the first timing adjustment value to the second wireless node via physical layer signaling. The operations of 1710 may be performed according to the methods described herein. In some examples, aspects of the operations of 1710 may be performed by a physical layer signaling manager as described with reference to FIGS. 13 through 16.

Figure 18:
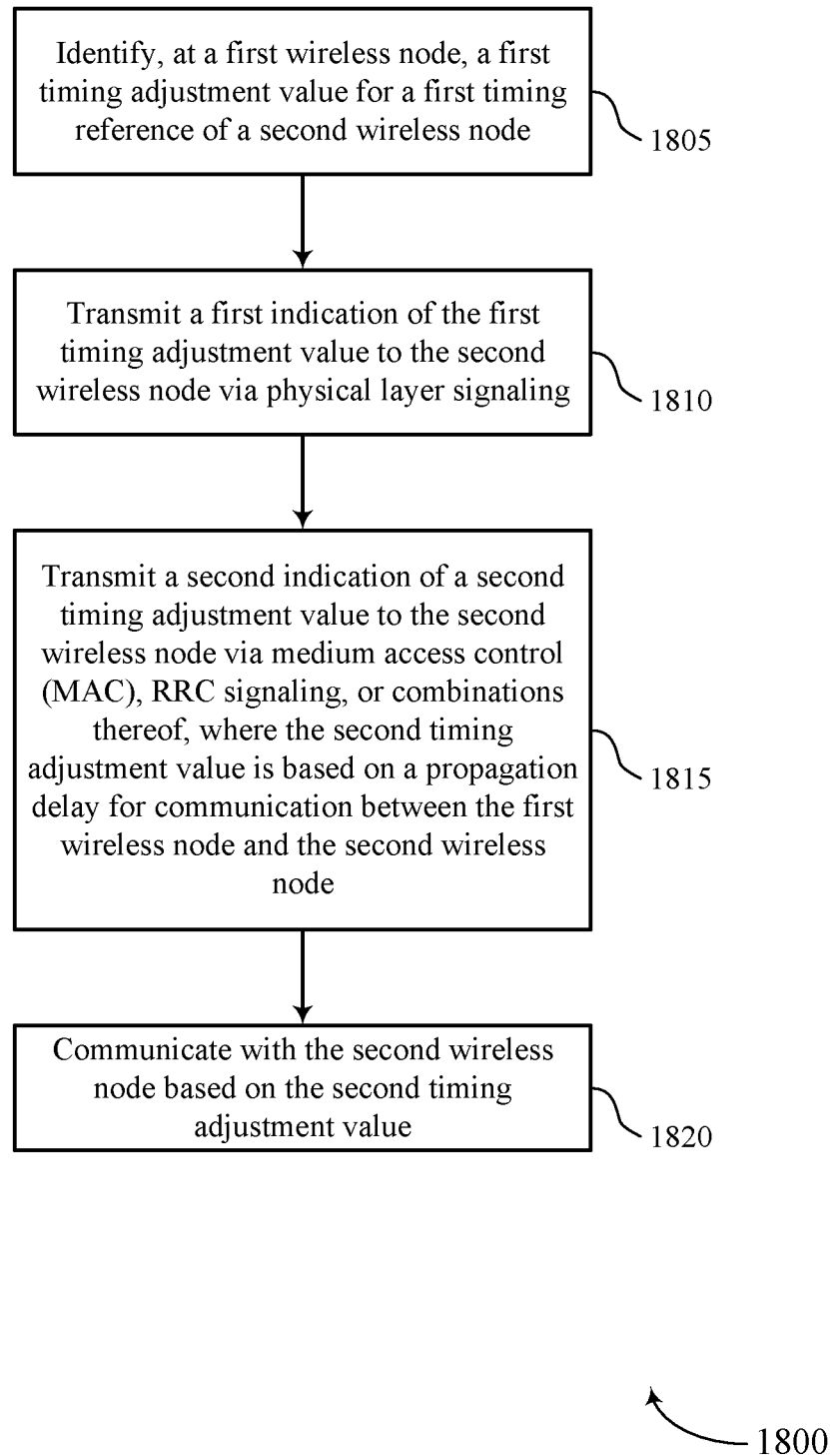

FIG. 18 shows a flowchart illustrating a method 1800 that supports timing adjustment techniques in wireless communications in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 1805, the base station may be a first wireless node and may identify a first timing adjustment value for a first timing reference of a second wireless node. The operations of 1805 may be performed according to the methods described herein. In some examples, aspects of the operations of 1805 may be performed by a timing adjustment manager as described with reference to FIGS. 13 through 16.

At 1810, the base station may transmit a first indication of the first timing adjustment value to the second wireless node via physical layer signaling. The operations of 1810 may be performed according to the methods described herein. In some examples, aspects of the operations of 1810 may be performed by a physical layer signaling manager as described with reference to FIGS. 13 through 16.

At 1815, the base station may transmit a second indication of a second timing adjustment value to the second wireless node via MAC-CE, RRC signaling, or combinations thereof, where the second timing adjustment value is based on a propagation delay for communication between the first wireless node and the second wireless node. The operations of 1815 may be performed according to the methods described herein. In some examples, aspects of the operations of 1815 may be performed by a physical layer signaling manager as described with reference to FIGS. 13 through 16.

At 1820, the base station may communicate with the second wireless node based on the second timing adjustment value. The operations of 1820 may be performed according to the methods described herein. In some examples, aspects of the operations of 1820 may be performed by a communications link manager as described with reference to FIGS. 13 through 16.

Figure 19:
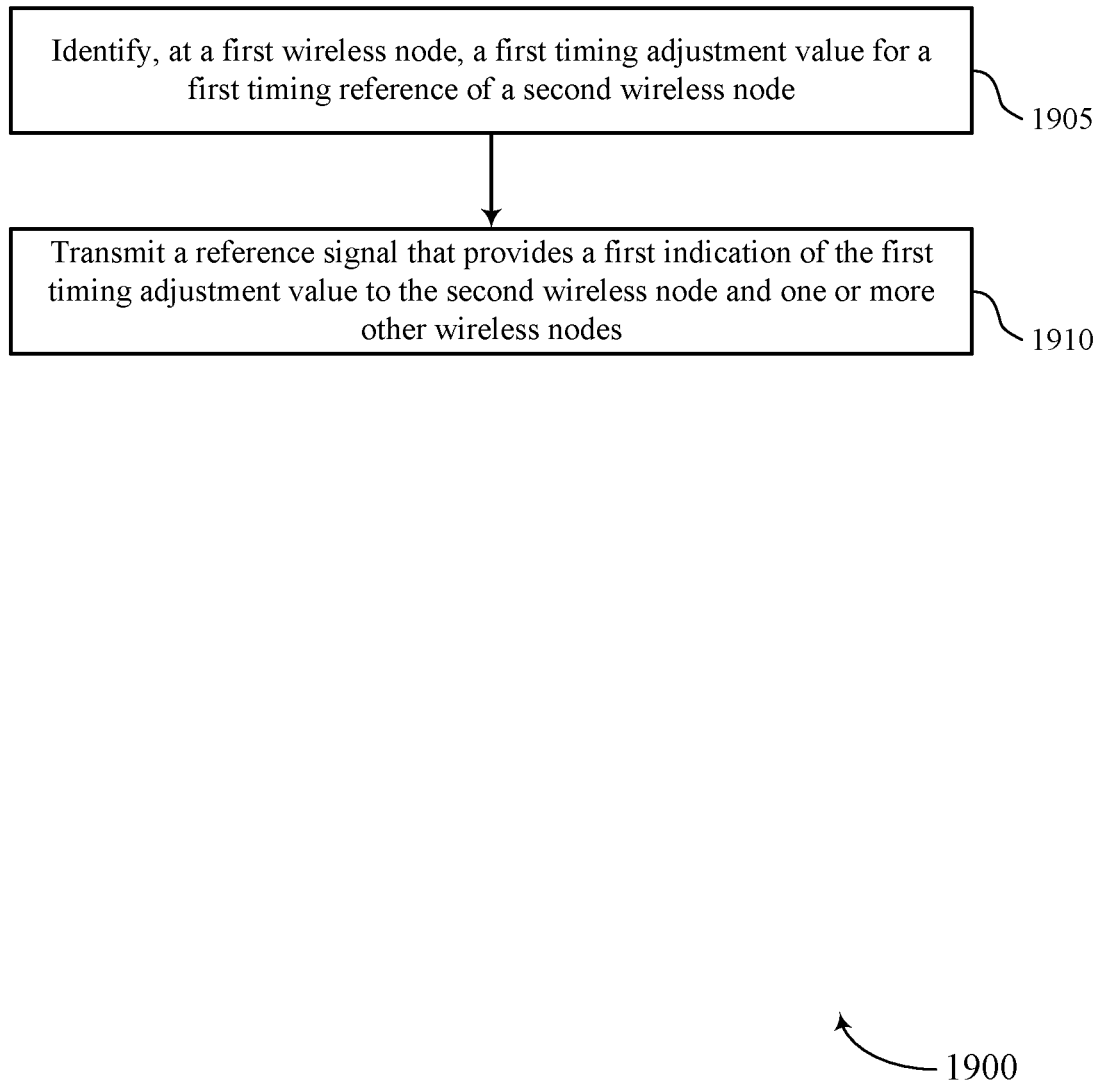

FIG. 19 shows a flowchart illustrating a method 1900 that supports timing adjustment techniques in wireless communications in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 1905, the base station may be a first wireless node and may identify a first timing adjustment value for a first timing reference of a second wireless node. The operations of 1905 may be performed according to the methods described herein. In some examples, aspects of the operations of 1905 may be performed by a timing adjustment manager as described with reference to FIGS. 13 through 16.

At 1910, the base station may transmit a reference signal that provides the first indication to the second wireless node and one or more other wireless nodes. The operations of 1910 may be performed according to the methods described herein. In some examples, aspects of the operations of 1910 may be performed by a reference signal manager as described with reference to FIGS. 13 through 16. In some cases, the first indication is an implicit indication of the first timing adjustment value. In some cases, a difference between a first timing of the reference signal transmission and a second timing of one or more other downlink transmissions corresponds to the first timing adjustment value. In some cases, the reference signal is a TA-RS. In some cases, the reference signal is one or more of a synchronization signal, a CSI-RS, a TRS, or any combinations thereof, and where a timing of the transmission of the reference signal provides the first indication of the first timing adjustment value.

In some cases, the reference signal is a periodic reference signal, an aperiodic reference signal, an event-based reference signal, or an on-demand reference signal that is transmitted responsive to a request from the second wireless node. In some cases, the reference signal is transmitted in one or more beamformed transmission beams across all or a portion of a coverage area of the first wireless node. In some cases, the reference signal is a cell-specific reference signal associated with the first wireless node. In some cases, the reference signal is QCL with one or more other reference signals. In some cases, the base station may transmit a first indication of the first timing adjustment value to the second wireless node via physical layer signaling.

Figure 20:
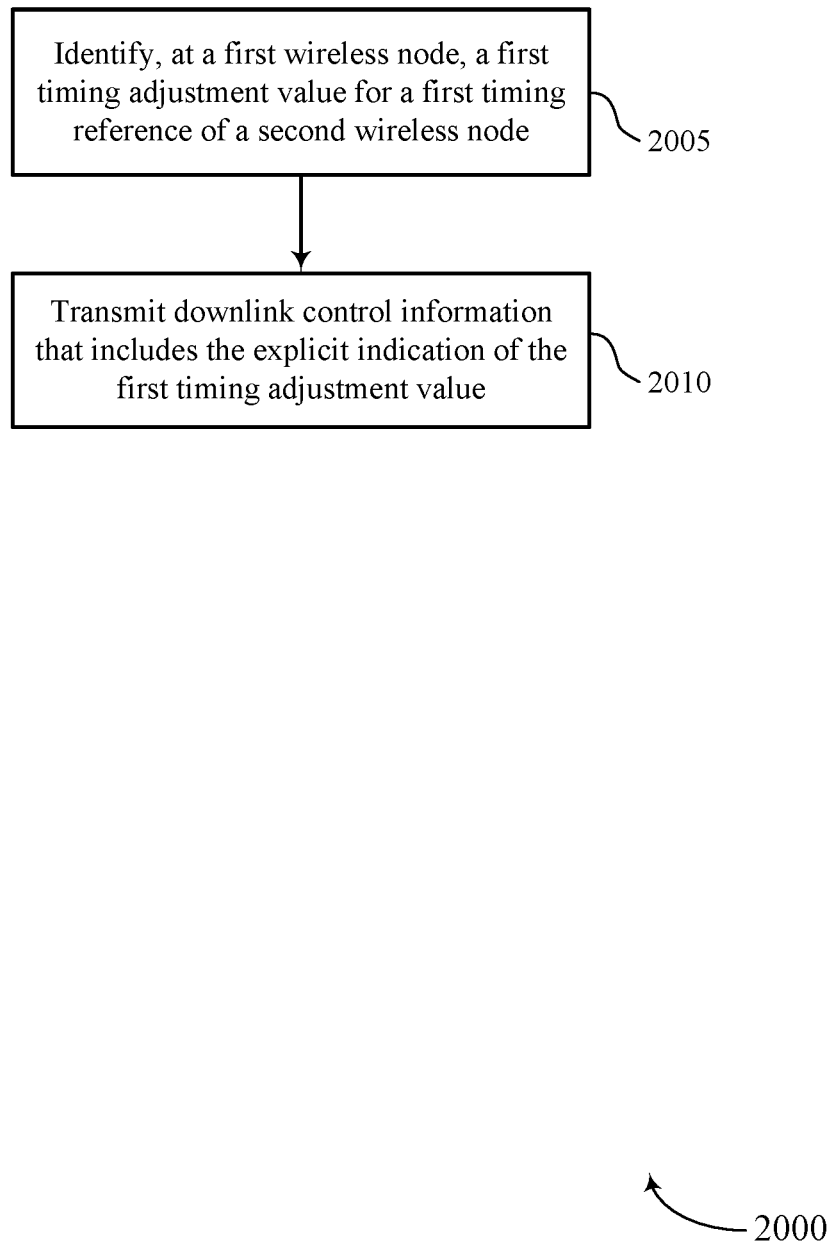

FIG. 20 shows a flowchart illustrating a method 2000 that supports timing adjustment techniques in wireless communications in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2005, the base station may be a first wireless node and may identify a first timing adjustment value for a first timing reference of a second wireless node. The operations of 2005 may be performed according to the methods described herein. In some examples, aspects of the operations of 2005 may be performed by a timing adjustment manager as described with reference to FIGS. 13 through 16.

At 2010, the base station may transmit downlink control information that includes the explicit indication of the first timing adjustment value. The operations of 2010 may be performed according to the methods described herein. In some examples, aspects of the operations of 2015 may be performed by a DCI manager as described with reference to FIGS. 13 through 16. In some cases, the downlink control information includes a GC-DCI transmission. In some cases, the base station may scramble the downlink control information using a scrambling identification that corresponds to the first timing reference.

Figure 21:
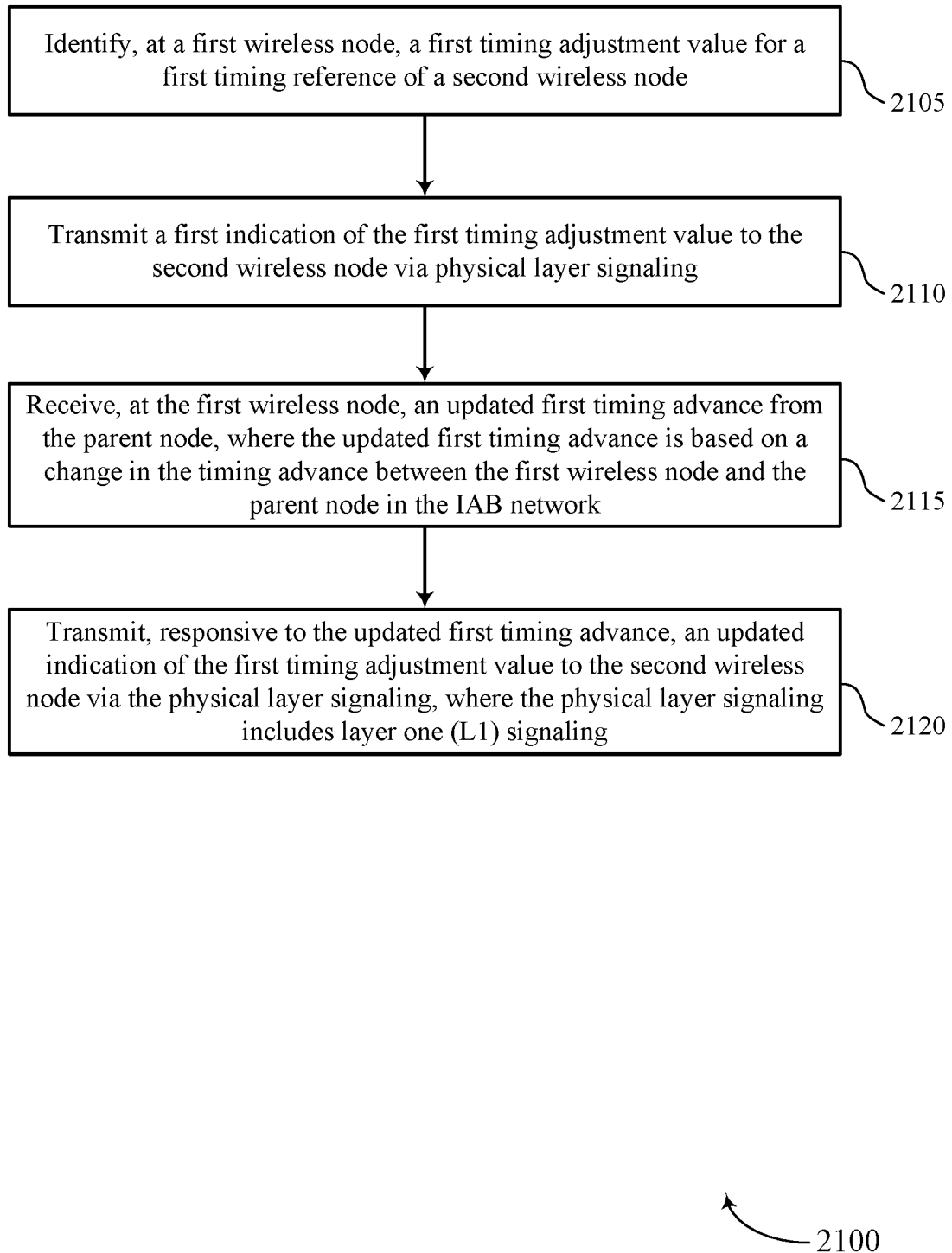

FIG. 21 shows a flowchart illustrating a method 2100 that supports timing adjustment techniques in wireless communications in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2105, the base station may be a first wireless node, and may identify a first timing adjustment value for a first timing reference of a second wireless node. The operations of 2105 may be performed according to the methods described herein. In some examples, aspects of the operations of 2105 may be performed by a timing adjustment manager as described with reference to FIGS. 13 through 16.

At 2110, the base station may transmit a first indication of the first timing adjustment value to the second wireless node via physical layer signaling. The operations of 2110 may be performed according to the methods described herein. In some examples, aspects of the operations of 2110 may be performed by a physical layer signaling manager as described with reference to FIGS. 13 through 16. In some cases, the first wireless node is a relay node in an IAB network, and where the first timing adjustment value is based on a first timing advance between the first wireless node and a parent node in the IAB network.

At 2115, the base station may receive an updated first timing advance from the parent node, where the updated first timing advance is based on a change in the timing advance between the first wireless node and the parent node in the IAB network. The operations of 2115 may be performed according to the methods described herein. In some examples, aspects of the operations of 2115 may be performed by a timing adjustment manager as described with reference to FIGS. 13 through 16.

At 2120, the base station may transmit, responsive to the updated first timing advance, an updated indication of the first timing adjustment value to the second wireless node via the physical layer signaling, where the physical layer signaling includes layer one (L1) signaling. The operations of 2120 may be performed according to the methods described herein. In some examples, aspects of the operations of 2120 may be performed by a timing adjustment manager as described with reference to FIGS. 13 through 16.

Figure 22:
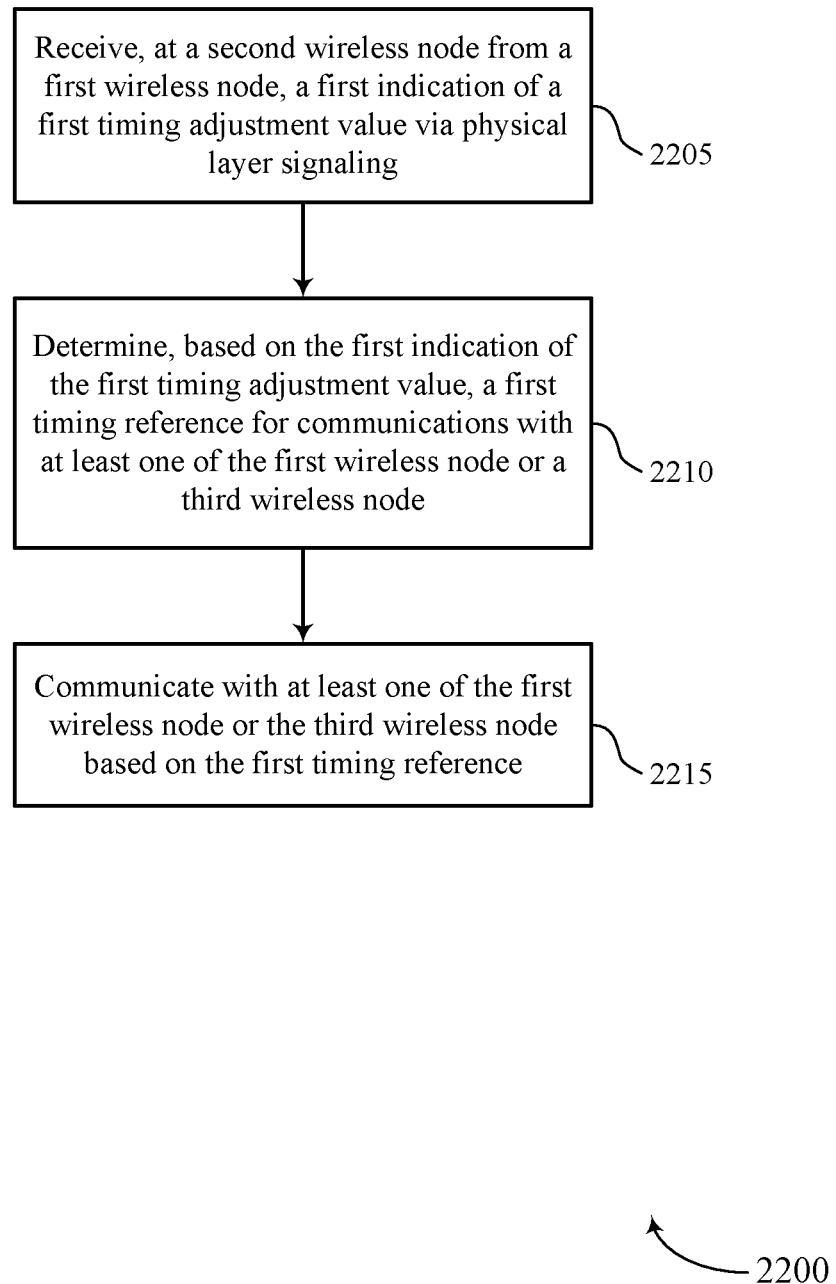

FIG. 22 shows a flowchart illustrating a method 2200 that supports timing adjustment techniques in wireless communications in accordance with aspects of the present disclosure. The operations of method 2200 may be implemented by a UE 115 or base station 105 or its components as described herein. For example, the operations of method 2200 may be performed by a communications manager as described with reference to FIGS. 8 through 12. In some examples, a UE or base station may execute a set of instructions to control the functional elements of the UE or base station to perform the functions described herein. Additionally or alternatively, a UE or base station may perform aspects of the functions described herein using special-purpose hardware.

At 2205, the UE or base station be a second wireless node and may receive, from a first wireless node, a first indication of a first timing adjustment value via physical layer signaling. The operations of 2205 may be performed according to the methods described herein. In some examples, aspects of the operations of 2205 may be performed by a physical layer signaling manager as described with reference to FIGS. 8 through 12.

At 2210, the UE or base station may determine, based on the first indication of the first timing adjustment value, a first timing reference for communications with at least one of the first wireless node or a third wireless node. The operations of 2210 may be performed according to the methods described herein. In some examples, aspects of the operations of 2210 may be performed by a timing adjustment manager as described with reference to FIGS. 8 through 12.

At 2215, the UE or base station may communicate with at least one of the first wireless node or the third wireless node based on the first timing reference. The operations of 2215 may be performed according to the methods described herein. In some examples, aspects of the operations of 2215 may be performed by a communications link manager as described with reference to FIGS. 8 through 12.

Figure 23:
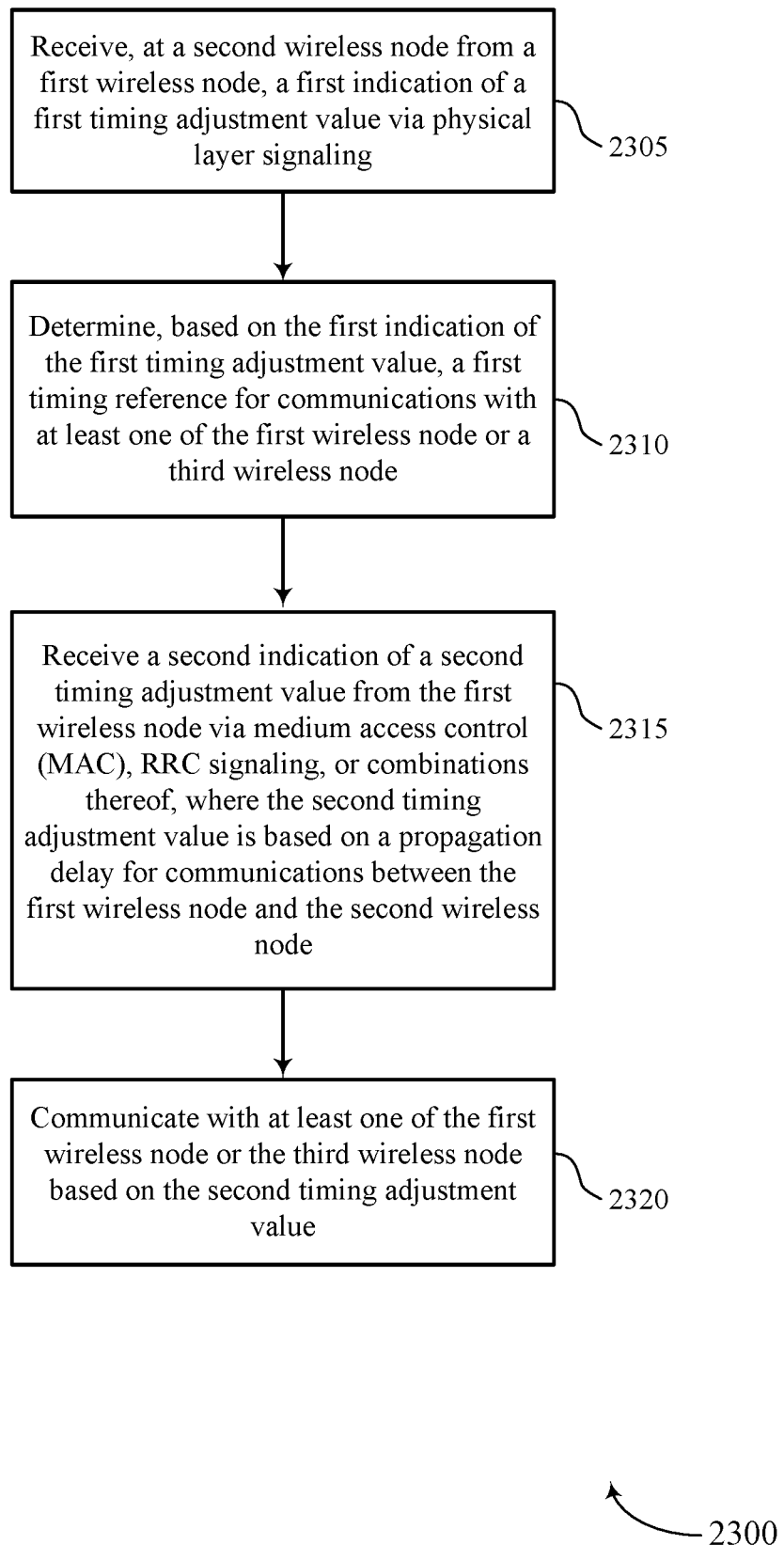

FIG. 23 shows a flowchart illustrating a method 2300 that supports timing adjustment techniques in wireless communications in accordance with aspects of the present disclosure. The operations of method 2300 may be implemented by a UE 115 or base station 105 or its components as described herein. For example, the operations of method 2300 may be performed by a communications manager as described with reference to FIGS. 8 through 12. In some examples, a UE or base station may execute a set of instructions to control the functional elements of the UE or base station to perform the functions described herein. Additionally or alternatively, a UE or base station may perform aspects of the functions described herein using special-purpose hardware.

At 2305, the UE or base station may be a second wireless node and may receive, from a first wireless node, a first indication of a first timing adjustment value via physical layer signaling. The operations of 2305 may be performed according to the methods described herein. In some examples, aspects of the operations of 2305 may be performed by a physical layer signaling manager as described with reference to FIGS. 8 through 12.

At 2310, the UE or base station may determine, based on the first indication of the first timing adjustment value, a first timing reference for communications with at least one of the first wireless node or a third wireless node. The operations of 2310 may be performed according to the methods described herein. In some examples, aspects of the operations of 2310 may be performed by a timing adjustment manager as described with reference to FIGS. 8 through 12.

At 2315, the UE or base station may receive a second indication of a second timing adjustment value from the first wireless node via medium access control (MAC), RRC signaling, or combinations thereof, where the second timing adjustment value is based on a propagation delay for communications between the first wireless node and the second wireless node. The operations of 2315 may be performed according to the methods described herein. In some examples, aspects of the operations of 2315 may be performed by a physical layer signaling manager as described with reference to FIGS. 8 through 12.

At 2320, the UE or base station may communicate with at least one of the first wireless node or a third wireless node based on the second timing adjustment value. The operations of 2320 may be performed according to the methods described herein. In some examples, aspects of the operations of 2320 may be performed by a timing adjustment manager as described with reference to FIGS. 8 through 12.

Figure 24:
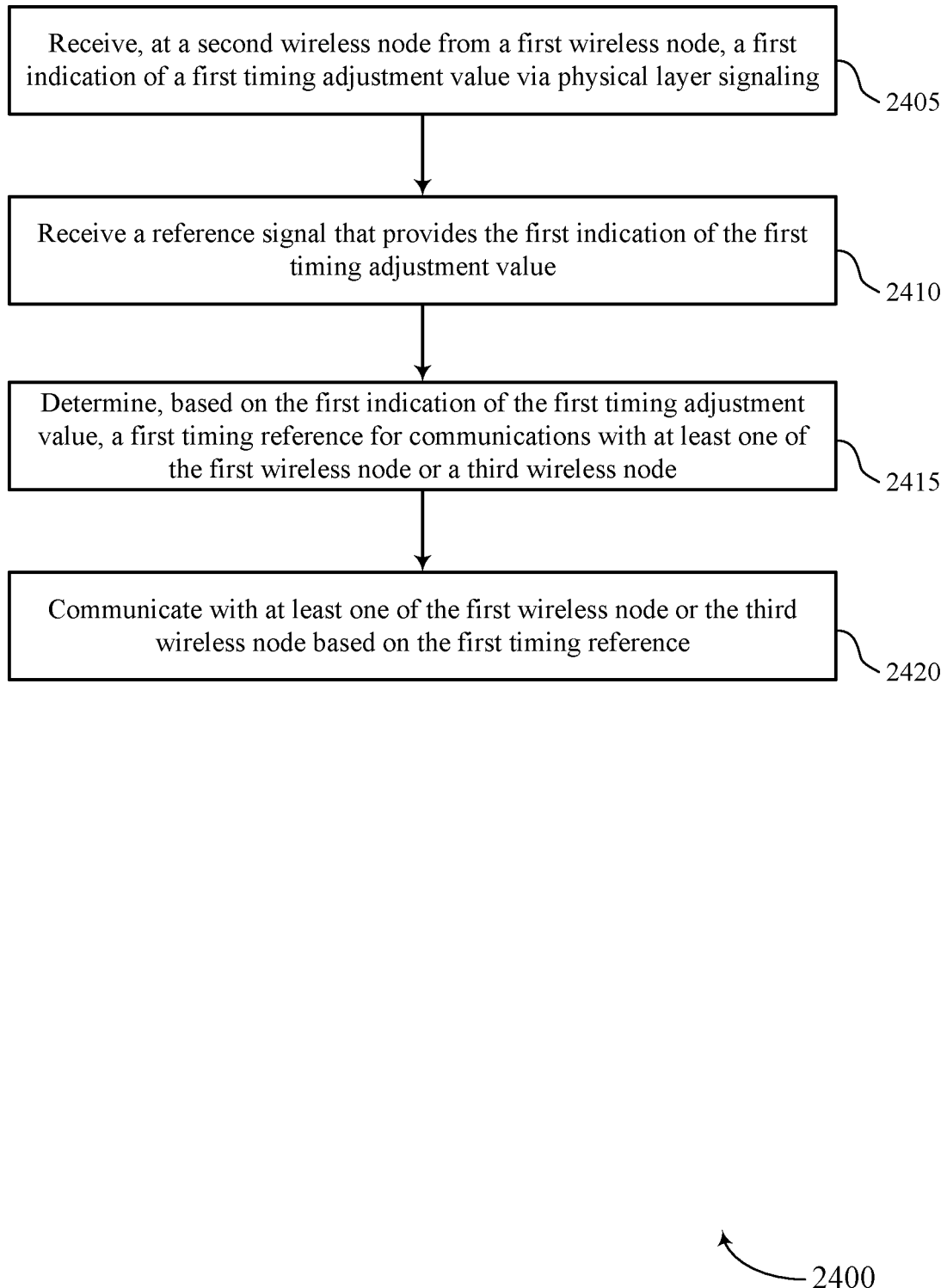

FIG. 24 shows a flowchart illustrating a method 2400 that supports timing adjustment techniques in wireless communications in accordance with aspects of the present disclosure. The operations of method 2400 may be implemented by a UE 115 or base station 105 or its components as described herein. For example, the operations of method 2400 may be performed by a communications manager as described with reference to FIGS. 8 through 12. In some examples, a UE or base station may execute a set of instructions to control the functional elements of the UE or base station to perform the functions described herein. Additionally or alternatively, a UE or base station may perform aspects of the functions described herein using special-purpose hardware.

At 2405, the UE or base station may be a second wireless node and may receive, from a first wireless node, a first indication of a first timing adjustment value via physical layer signaling. The operations of 2405 may be performed according to the methods described herein. In some examples, aspects of the operations of 2405 may be performed by a physical layer signaling manager as described with reference to FIGS. 8 through 12. In some cases, the first indication is an implicit indication of the first timing adjustment value.

At 2410, the UE or base station may receive a reference signal that provides the first indication of the first timing adjustment value. The operations of 2410 may be performed according to the methods described herein. In some examples, aspects of the operations of 2410 may be performed by a reference signal manager as described with reference to FIGS. 8 through 12.

At 2415, the UE or base station may determine, based on the first indication of the first timing adjustment value, a first timing reference for communications with at least one of the first wireless node or a third wireless node. The operations of 2415 may be performed according to the methods described herein. In some examples, aspects of the operations of 2415 may be performed by a timing adjustment manager as described with reference to FIGS. 8 through 12. In some cases, a difference between a first timing of the reference signal and a second timing of one or more other downlink transmissions corresponds to the first timing adjustment value.

At 2420, the UE or base station may communicate with at least one of the first wireless node or the third wireless node based on the first timing reference. The operations of 2420 may be performed according to the methods described herein. In some examples, aspects of the operations of 2420 may be performed by a communications link manager as described with reference to FIGS. 8 through 12.

Figure 25:
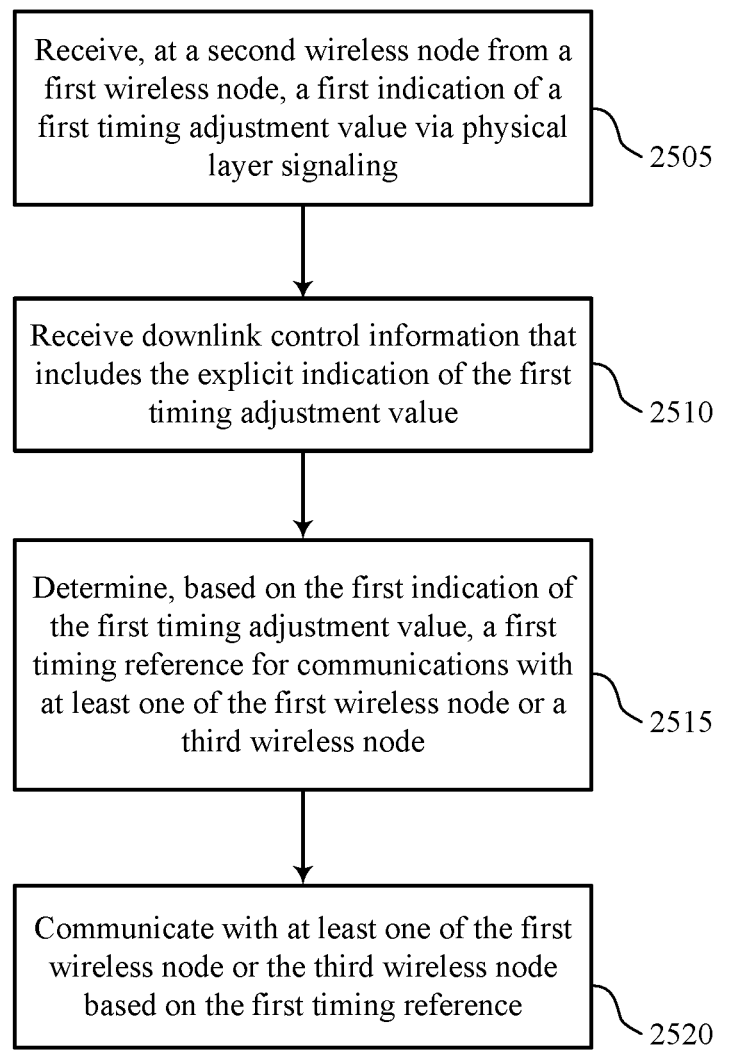

FIG. 25 shows a flowchart illustrating a method 2500 that supports timing adjustment techniques in wireless communications in accordance with aspects of the present disclosure. The operations of method 2500 may be implemented by a UE 115 or base station 105 or its components as described herein. For example, the operations of method 2500 may be performed by a communications manager as described with reference to FIGS. 8 through 12. In some examples, a UE or base station may execute a set of instructions to control the functional elements of the UE or base station to perform the functions described herein. Additionally or alternatively, a UE or base station may perform aspects of the functions described herein using special-purpose hardware.

At 2505, the UE or base station may be a second wireless node and may receive, from a first wireless node, a first indication of a first timing adjustment value via physical layer signaling. The operations of 2505 may be performed according to the methods described herein. In some examples, aspects of the operations of 2505 may be performed by a physical layer signaling manager as described with reference to FIGS. 8 through 12.

At 2510, the UE or base station may receive downlink control information that includes the explicit indication of the first timing adjustment value. The operations of 2510 may be performed according to the methods described herein. In some examples, aspects of the operations of 2510 may be performed by a DCI manager as described with reference to FIGS. 8 through 12.

At 2515, the UE or base station may determine, based on the first indication of the first timing adjustment value, a first timing reference for communications with at least one of the first wireless node or a third wireless node. The operations of 2515 may be performed according to the methods described herein. In some examples, aspects of the operations of 2515 may be performed by a timing adjustment manager as described with reference to FIGS. 8 through 12.

At 2520, the UE or base station may communicate with at least one of the first wireless node or the third wireless node based on the first timing reference. The operations of 2520 may be performed according to the methods described herein. In some examples, aspects of the operations of 2520 may be performed by a communications link manager as described with reference to FIGS. 8 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
   at least one processor; and
   at least one memory coupled with the at least one processor, the at least one processor configured to:
   identify a first timing adjustment value for a first timing reference of a second wireless node; and
   transmit, within a guard period associated with physical layer signaling, a timing advance reference signal that provides a first indication of the first timing adjustment value to the second wireless node via the physical layer signaling, wherein the first timing adjustment value is based at least in part on a difference between a first timing of a transmission of the first indication and a second timing of one or more other transmissions.

2. The apparatus of claim 1, wherein the timing advance reference signal is one or more of a synchronization signal, a channel state information reference signal (CSI-RS), a tracking reference signal (TRS), or any combinations thereof.

3. The apparatus of claim 1, wherein the timing advance reference signal is a periodic reference signal, an aperiodic reference signal, an event-based reference signal, or an on-demand reference signal.

4. The apparatus of claim 1, wherein a timing of a transmission of the timing advance reference signal provides the first indication of the first timing adjustment value.

5. The apparatus of claim 1, wherein the timing advance reference signal is a cell-specific reference signal associated with a first wireless node associated with the apparatus.

6. The apparatus of claim 1, wherein the timing advance reference signal is configured to be transmitted in one or more beamformed transmission beams across all or a portion of a coverage area of a first wireless node associated with the apparatus.

7. The apparatus of claim 1, further comprising:
   a transceiver coupled with the at least one processor, wherein the at least one processor configured to transmit the first indication is further configured to:
   configure a first portion of the guard period associated with the physical layer signaling based at least in part on a timing duration associated with the first timing adjustment value; and
   transmit the timing advance reference signal after the first portion of the guard period.

8. The apparatus of claim 1, wherein the physical layer signaling comprises layer one (L1) signaling.

9. The apparatus of claim 1, wherein the second timing of the one or more other transmissions corresponds to a transmission time of a synchronization signal block.

10. The apparatus of claim 1, wherein the timing advance reference signal is configured to be transmitted responsive to a request from the second wireless node.

11. The apparatus of claim 1, wherein the at least one processor is further configured to:
    configure the second wireless node to receive the timing advance reference signal.

12. The apparatus of claim 11, wherein the at least one processor configured to configure the second wireless node is further configured to:
    transmit one or more of a system information block (SIB), radio resource control (RRC) signaling, a medium access control (MAC) control element, other higher layer signaling, or any combinations thereof, that includes configuration information for the second wireless node to receive the timing advance reference signal.

13. The apparatus of claim 1, wherein the second wireless node and a first wireless node associated with the apparatus are nodes in an integrated access and backhaul (IAB) network.

14. The apparatus of claim 1, wherein the first timing adjustment value is based at least in part on distance between a first node associated with the apparatus and at least one node different from the second wireless node.

15. An apparatus for wireless communications, comprising:
    at least one processor; and
    at least one memory coupled with the at least one processor, the at least one processor configured to:
    receive, within a guard period associated with physical layer signaling, a timing advance reference signal that provides a first indication of a first timing adjustment value via the physical layer signaling, wherein the first timing adjustment value is based at least in part on a difference between a first timing of a transmission of the first indication and a second timing of one or more other transmissions; and
    communicate with at least one node based at least in part on a first timing reference associated with the first timing adjustment value.

16. The apparatus of claim 15, wherein the timing advance reference signal is one or more of a synchronization signal, a channel state information reference signal (CSI-RS), a tracking reference signal (TRS), or any combinations thereof.

17. The apparatus of claim 15, wherein the timing advance reference signal is a periodic reference signal, an aperiodic reference signal, an event-based reference signal, or an on-demand reference signal.

18. The apparatus of claim 15, wherein the physical layer signaling comprises layer one (L1) signaling.

19. The apparatus of claim 15, further comprising:
a transceiver coupled with the at least one processor, wherein the at least one processor is further configured to:
receive configuration information to monitor for the timing advance reference signal, wherein the configuration information comprises one or more of a system information block (SIB), radio resource control (RRC) signaling, a medium access control (MAC) control element, other higher layer signaling, or any combinations thereof.

20. A method for wireless communications, comprising:
identifying, at a first wireless node, a first timing adjustment value for a first timing reference of a second wireless node; and
transmitting, within a guard period associated with physical layer signaling, a timing advance reference signal that provides a first indication of the first timing adjustment value to the second wireless node via the physical layer signaling, wherein the first timing adjustment value is based at least in part on a difference between a first timing of a transmission of the first indication and a second timing of one or more other transmissions.

21. The method of claim 20, wherein the transmitting the timing advance reference signal comprises:
configuring a first portion of the guard period associated with the physical layer signaling based at least in part on a timing duration associated with the first timing adjustment value; and
transmitting the timing advance reference signal after the first portion of the guard period.

22. The method of claim 20, further comprising:
configuring the second wireless node to receive the timing advance reference signal.

23. A method for wireless communications, comprising:
receiving, within a guard period associated with physical layer signaling, a timing advance reference signal that provides a first indication of a first timing adjustment value from a first wireless node via the physical layer signaling, wherein the first timing adjustment value is based at least in part on a difference between a first timing of a transmission of the first indication and a second timing of one or more other transmissions; and
communicating with at least one node based at least in part on a first timing reference associated with the first timing adjustment value.

24. The method of claim 23, wherein the physical layer signaling comprises layer one (L1) signaling.

25. The method of claim 23, further comprising:
receiving configuration information for monitoring for the timing advance reference signal, wherein the configuration information comprises one or more of a system information block (SIB), radio resource control (RRC) signaling, a medium access control (MAC) control element, other higher layer signaling, or any combinations thereof.

26. A non-transitory computer-readable medium storing code for wireless communications, the code comprising instructions executable by at least one processor to:
identify, at a first wireless node, a first timing adjustment value for a first timing reference of a second wireless node; and
transmit, within a guard period associated with physical layer signaling, a timing advance reference signal that provides a first indication of the first timing adjustment value to the second wireless node via the physical layer signaling, wherein the first timing adjustment value is based at least in part on a difference between a first timing of a transmission of the first indication and a second timing of one or more other transmissions.

27. The non-transitory computer-readable medium of claim 26, wherein the instructions to transmit the timing advance reference signal are executable by the at least one processor to:
configure a first portion of the guard period associated with the physical layer signaling based at least in part on a timing duration associated with the first timing adjustment value; and
transmit the timing advance reference signal after the first portion of the guard period.

28. The non-transitory computer-readable medium of claim 26, wherein the instructions are further executable by the at least one processor to:
configure the second wireless node to receive the timing advance reference signal.

29. A non-transitory computer-readable medium storing code for wireless communications, the code comprising instructions executable by at least one processor to:
receive, within a guard period associated with physical layer signaling, a timing advance reference signal that provides a first indication of a first timing adjustment value from a first wireless node via the physical layer signaling, wherein the first timing adjustment value is based at least in part on a difference between a first timing of a transmission of the first indication and a second timing of one or more other transmissions; and
communicate with at least one node based at least in part on a first timing reference associated with the first timing adjustment value.

30. The non-transitory computer-readable medium of claim 29, wherein the instructions are further executable by the at least one processor to:
receive configuration information for monitoring for the timing advance reference signal, wherein the configuration information comprises one or more of a system information block (SIB), radio resource control (RRC) signaling, a medium access control (MAC) control element, other higher layer signaling, or any combinations thereof.

* * * * *